US012423685B2

(12) United States Patent
Camenisch et al.

(10) Patent No.: US 12,423,685 B2
(45) Date of Patent: Sep. 23, 2025

(54) DISTRIBUTED NETWORK WITH CONSENSUS MECHANISM

(71) Applicant: DFINITY STIFTUNG, Zurich (CH)

(72) Inventors: Jan Camenisch, Thalwil (CH); Manu Drijvers, Zurich (CH); Robert Lauko, Wallisellen (CH); Timo Hanke, Palo Alto, CA (US); Mahnush Movahedi, Menlo Park, CA (US); Dominic Williams, Palo Alto, CA (US)

(73) Assignee: DFINITY STIFTUNG, Zürich (CH)

( * ) Notice: Subject to any disclaimer, the term of this patent is extended or adjusted under 35 U.S.C. 154(b) by 187 days.

(21) Appl. No.: 17/770,945

(22) PCT Filed: Oct. 22, 2020

(86) PCT No.: PCT/EP2020/079824
§ 371 (c)(1),
(2) Date: Apr. 21, 2022

(87) PCT Pub. No.: WO2021/078903
PCT Pub. Date: Apr. 29, 2021

(65) Prior Publication Data
US 2022/0383304 A1    Dec. 1, 2022

(30) Foreign Application Priority Data
Oct. 22, 2019    (WO) ................. PCT/EP2019/078767

(51) Int. Cl.
*G06Q 20/38*    (2012.01)
*G06Q 20/22*    (2012.01)

(52) U.S. Cl.
CPC ....... *G06Q 20/3825* (2013.01); *G06Q 20/223* (2013.01); *G06Q 20/38215* (2013.01)

(58) Field of Classification Search
CPC ............. G06Q 20/3825; G06Q 20/223; G06Q 20/38215; G06Q 20/065; H04L 9/50; H04L 67/104; H04L 67/1097
See application file for complete search history.

(56) References Cited

U.S. PATENT DOCUMENTS

2018/0101842 A1*  4/2018  Ventura ................ G06Q 10/087
2019/0260574 A1    8/2019  Shi et al.
(Continued)

FOREIGN PATENT DOCUMENTS

JP    2020503728 A    1/2020
KR    101975822       5/2019
(Continued)

OTHER PUBLICATIONS

Timo Hanke, et al., "DFINITY Technology Overview Series Consensus System", Proceedings of Technology Overview Series, Jan. 23, 2018, 16 pages.
(Continued)

*Primary Examiner* — Patrick McAtee
*Assistant Examiner* — Vincent I Idiake
(74) *Attorney, Agent, or Firm* — Mannava & Kang, P.C.

(57) ABSTRACT

An aspect of the invention relates to a distributed network comprising a plurality of network nodes. The distributed network is configured to perform a method for reaching a consensus on a sequence of values in an advantageous manner. The method performs consecutive notarization rounds. The notarization rounds comprise steps of creating value proposals to be added to the sequence, communicating the value proposals to a notarization subset of the plurality of nodes and performing a validity check of received value proposals. The notarization rounds may comprise further steps of executing individual notarization signatures on a subset of the value proposals that are valid. The notarization
(Continued)

rounds may further comprise performing a consistency check of the value proposals and executing consistency signatures on a subset of the value proposals. The method may further comprise a finality procedure to finalize a value proposal once a predefined finality rule set has been fulfilled.

23 Claims, 13 Drawing Sheets

(56) References Cited

U.S. PATENT DOCUMENTS

| | | | | |
|---|---|---|---|---|
| 2019/0287200 | A1* | 9/2019 | Schuler | G06Q 50/265 |
| 2019/0342422 | A1* | 11/2019 | Li | H04L 67/104 |
| 2019/0377617 | A1* | 12/2019 | Jacobs | H04L 9/0637 |
| 2020/0104293 | A1* | 4/2020 | Shi | G06F 16/2365 |
| 2020/0134578 | A1* | 4/2020 | Shi | G06Q 20/065 |

FOREIGN PATENT DOCUMENTS

| | | |
|---|---|---|
| WO | 2018222927 A1 | 12/2018 |
| WO | 2019072294 A2 | 4/2019 |

OTHER PUBLICATIONS

International Search Report for International Application No. PCT/EP2020/079824 mailed on Jan. 11, 2021, pp. 3.

Machine English translation of "Notice of Reasons for Refusal for Japanese Patent Application No. 2022-523573", draft dated Sep. 6, 2024, 4 pages.

Machine English translation of "Ripple", Shuwa System Co., Ltd, Aug. 1, 2017, pp. 183-188.

English translation of "Notice of Preliminary Rejection for Korean Patent Application No. 2022-7017015", dated Jan. 7, 2025, 13 pages.

* cited by examiner

401

402

Finalization rounds

1400

✓ Full notarization
☆ Consistency signature

DISTRIBUTED NETWORK WITH CONSENSUS MECHANISM

CLAIM FOR PRIORITY

The present application is a national stage filing under 35 U.S.C 371 of PCT application number PCT/EP2020/079824, having an international filing date of Oct. 22, 2020, which claims priority of PCT application number PCT/EP2019/078767, having an international filing date of Oct. 22, 2019, the disclosures of which are hereby incorporated by reference in their entireties.

TECHNICAL FIELD

The present invention pertains to a distributed network comprising a plurality of network nodes. The distributed network is configured to reach a consensus on a sequence of values, in particular to reach a consensus on blocks to be written to a blockchain.

Further aspects relate to a computer-implemented method for reaching a consensus on a sequence of values, in particular on blocks to be written to a blockchain, a node of a distributed network, a corresponding computer program product and a software architecture encoded on a non-transitory medium.

BACKGROUND ART

In distributed networks a plurality of nodes are arranged in a distributed fashion. In distributed networks computing, software and data are spread out across the plurality of nodes. The nodes establish computing resources and the distributed networks may use distributed computing techniques.

An example of distributed networks are blockchain networks. Blockchain networks are consensus-based, electronic ledgers based on blocks. Each block comprises transactions and other information. Furthermore, each block contains a hash of the previous block so that blocks become chained together to create a permanent, unalterable record of all transactions which have been written to the blockchain. Transactions may call small programs known e.g. as smart contracts.

In order for a transaction to be written to the blockchain, it must be "validated" and agreed upon by the network. In other words, the network nodes have to reach consensus on blocks to be written to the blockchain. Such consensus may be achieved by various consensus protocols.

In one type of blockchain networks, consensus is achieved by using a proof-of-work algorithm. A proof-of-work consensus protocol generally requires some work from the parties that participate in the consensus protocol, usually corresponding to processing time by a computer. Proof-of-work-based cryptocurrency systems such as Bitcoin involve the solving of computationally intensive puzzles.

Another type of consensus protocols is based on a proof-of-stake algorithm. Such proof-of-stake protocols have the advantage that they do not require time-consuming and energy-intensive computing. In proof-of-stake based blockchain networks e.g. the creator of the next block is chosen via combinations of random selection as well as the stake of the respective node in the network.

Apart from cryptocurrencies, distributed networks may be used for various other applications. In particular, they may be used for providing decentralized and distributed computing capabilities and services. To this end, distributed networks may use a state machine replication protocol to reliably run applications and store states across multiple nodes even in the presence of crashing nodes and adversarial attacks.

Consensus protocols used in blockchain networks can be designed to reach fast finality on transactions contained in blocks by applying a "Byzantine fault tolerant" (BFT) agreement protocol. "Synchronous" BFT protocols rely on network synchrony assumptions for safety, while "asynchronous" BFT protocols do not. Asynchronous BFT protocols can typically tolerate less than ⅓ (one third) corrupt participating nodes.

However, there remains a need for distributed networks with advanced consensus mechanisms and functionalities.

DISCLOSURE OF THE INVENTION

Accordingly, one object of an aspect of the invention is to provide a distributed network configured to reach a consensus on a sequence of values in an advanced manner, in particular for asynchronous consensus protocols, in particular in terms of throughput.

According to an embodiment of an aspect of the invention, there is provided a distributed network according to claim 1.

More particularly, a distributed network according to embodiments of the invention may comprise a plurality of network nodes. The distributed network may be configured to perform a method for reaching a consensus on a sequence of values, in particular by an asynchronous consensus protocol. The method may comprise a step of performing consecutive notarization rounds. The notarization rounds may be numbered with a consecutive notarization round number. The notarization rounds may also be denoted just as rounds. The notarization rounds shall denote according to embodiments rounds during which the steps as described below are performed. The notarization rounds may comprise steps of creating, by one or more network nodes, value proposals to be added to the sequence and communicating the value proposals to a notarization subset of the plurality of nodes. According to an embodiment, the value proposals may comprise a link to a parent value proposal of a previous notarization round.

A notarization subset shall denote according to embodiments a subset of the plurality of nodes that performs steps of the notarization round as described below. A notarization subset may also be denoted just as subset or first subset. The method may further comprise performing, by the notarization subset of the plurality of nodes, a validity check of received value proposals.

The validity check may comprise a check whether the received value proposals comply with a predefined validity rule set. The notarization rounds may comprise further steps of executing and communicating, by the notarization subset of the plurality of nodes, individual notarization signatures on a subset of the value proposals that are valid according to the validity check. Thereby individually-notary signed value proposals are created.

An individual notarization signature shall denote according to embodiments an electronic signature by an individual node of the notarization subset.

According to an embodiment, the notarization rounds may comprise a further step of notarizing, by the distributed network, a value proposal once a predefined number of individual notarization signatures has been collected or observed. Thereby a fully notarized value proposal for the respective notarization round is created.

The notarization rounds may comprise a further step of performing, by the nodes of the notarization subset, a consistency check of the value proposals of one or more notarization rounds with respect to its own individual notarization signatures executed in the current notarization round. The consistency check comprises a check whether the value proposals of one or more of the consecutive notarization rounds comply with a predefined consistency rule set.

According to embodiments the predefined consistency rule set takes into account each node's own individual notarization signatures executed in the current notarization round.

The notarization rounds may comprise further steps of executing and communicating, by the nodes of the notarization subset, a consistency signature on a subset of the value proposals that are consistent according to the consistency rule set, thereby creating consistency-signed value proposals.

A consistency signature shall denote according to embodiments an electronic signature by an individual node of the notarization subset.

The method may further comprise a finality procedure which is based on the consistency signatures or in other words which takes into account the consistency signatures. The finality procedure may comprise a step of finalizing, by the distributed network, a value proposal once a predefined finality rule set has been fulfilled for the value proposal. The finality rule set may comprise a predefined minimum number of consistency signatures. The predefined minimum number of consistency signatures may be a sufficient criterion or a necessary criterion for the finalization.

As a result of the finality procedure a finalized value may be created. The finality procedure may comprise a further step of adding the finalized value to the sequence of values.

According to embodiments, a finalized value may be defined as a value on which the distributed network has reached consensus that it shall be added to the sequence of values.

Hence according to embodiments of the invention the notarization rounds and the finality procedure can be performed in a pipelined and staggered manner. More particularly, the distributed network may already proceed with a new notarization round and start to create new value proposals before a notarization round has been finalized. In other words, the notarization rounds and the finality procedure may work in an asynchronous manner. This may significantly increase the throughput of the system.

According to embodiments the consecutive notarization rounds may partly overlap with each other, i.e. a subsequent notarization round may start even though its preceding notarization round has not finished.

The finality procedure based on consistency signatures created according to the consistency rule set may guarantee safety of the consensus method in the Byzantine model even for asynchronous consensus protocols, i.e. even if no synchrony assumption can be made about the communication between nodes of the distributed network According to embodiments an asynchronous consensus protocol may be defined as a protocol which is configured to guarantee a successful consensus despite not having a guarantee that the nodes of the distributed network receive each message, in particular each individual notarization signature and each consistency signature, within a predefined time.

According to embodiments, the communicating of the value proposals to the notarization subset may be performed during a first period of the notarization rounds and the execution of the individual notarization and of the consistency signatures as well as the communicating of the individual notarization signatures and the consistency signatures may be performed during a second (subsequent) period of the notarization rounds.

This is a highly efficient communication scheme for an asynchronous consensus protocol. More particularly, after the communication of the value proposals, there are only two communication rounds needed which are arranged in the second period, one for the communication of the notarization signatures and one (subsequent) for the communication of the consistency signatures. After the first communication round of the two communication rounds arranged in the second period the embodied method may already continue with the next notarization round and accordingly with the communication of the next value proposal(s) without having to wait for the second communication round of the two communication rounds arranged in the second period to complete and without having to wait for the finalization of the finality procedure. Such an embodiment may reduce or minimize the idle time of the asynchronous consensus scheme, i.e. the time that cannot be used for the communication of new value proposals.

According to embodiments the first period of the notarization rounds may be chosen or configured at least as long as the second period of the notarization rounds. According to some embodiments the first period may be at least twice as long as the second period and according to yet further embodiment three times longer than the second period. This increases the time that can be used for the communication of value proposals. According to embodiments the distributed network may be configured to use at least 60% of the time for communicating the value proposals and according to further embodiments at least 75% of the time.

Such a communication scheme may effectively increase the throughput of the consensus mechanism. According to embodiments, throughput is defined as the combined size of all value proposals that are agreed on within a given unit of time. To achieve high throughput, embodiments of the invention use large (in number of bytes) value proposals. With large value proposals the bandwidth required to communicate the value proposals dominates over that required for notarization signatures and the consistency signatures. In this respect, in terms of throughput, value proposals with a size of at least 1 Mbyte are advantageous according to embodiments. Furthermore, individual notarization signatures and consistency signatures with a size of less than 200 Byte are advantageous according to embodiments.

A value may generally be any kind of information. According to embodiments, a value may be a transaction. According to further embodiments, a value may be a block of a blockchain.

According to embodiments the validity check may also be denoted just as first check, the validity rule set as a first rule set and the individual notarization signatures as individual first signatures.

According to embodiments the consistency check may also be denoted as second check, the consistency rule set as second rule set and the consistency signatures as second signatures. Furthermore, a consistency signature may be also denoted as individual consistency signature.

According to embodiments the finality rule set may also be denoted as third rule set.

In the following, the terms notarizing and fully notarizing and the terms notarized and fully notarized may be used interchangeably.

The step of performing the consistency check may be in particular performed once a fully notarized value proposal of a current notarization round has been observed.

According to an embodiment the step of creating a current value proposal for a current notarization round may comprise in particular linking the current value proposal to a fully notarized value proposal of a previous notarization round.

The link may be a reference by a hash digest. In other words, the link may be established by including a hash digest of the fully notarized value proposal in the current value proposal. According to such an embodiment, a network node that wants to create a new value proposal has to choose a parent value proposal from the previous notarization round. Hence according to embodiments a directed graph of value proposals is created.

It should be noted that according to such an embodiment the values as such do not need to be linked to each other a-priori. Hence according to embodiments the values may be completely independent values, while the value proposals are necessarily linked to each other.

According to an embodiment, the value proposals comprise the current notarization round number. This facilitates the processing of the value proposals by the nodes of the network.

During the validity check that is performed by the nodes of the notarization subset it is checked or examined whether the value proposals comply with a predefined validity rule set. The validity rule set may be e.g. specified as part of the specification of the distributed network.

According to an embodiment, the validity rule set may specify that a value proposal is only valid if its corresponding parent value proposal has been fully notarized.

In particular, the predefined validity rule set may define that a value proposal for a current notarization round is only valid if it links to a fully notarized value proposal of the notarization round that immediately precedes the current notarization round, while the latter may be denoted as parent value proposal.

According to a further embodiment, the predefined validity rule set may define that a value proposal for a current notarization round is only valid if it links to a fully notarized value proposal of a previous notarization round, where the previous notarization round generally precedes the current notarization round. According to such an embodiment, the term "previous notarization round" shall mean one of the previous notarization rounds. This may be the last notarization round, the second last notarization round, the third last notarization round and so on. More particularly, according to such an embodiment only every n-th value proposal has to be fully notarized according to the validity rule set. This may allow further parallelization.

According to such an embodiment, a full notarization makes a respective value proposal valid in the sense that future proposals are allowed to build on top of it, i.e. refer back to it as their parent value proposal.

Such an embodiment provides the advantage that only fully notarized value proposals can survive, i.e. have a chance to be added to the sequence of values. And this in return improves the security of the consensus mechanism. More particularly, it provides the technical advantage that the subsequent finalization of a value proposal based on counting the predefined number of consistency signatures works with improved security and avoids forking in an efficient manner.

According to further embodiments, the validity check for a given value proposal may be a check of one or more features of the given value proposal. According to embodiments, the one or more features may comprise the network node that created the given value proposal, the content of the given value proposal itself and/or the content of a previous value proposal that is linked to the given value proposal, in particular the content of the previous value proposal. According to embodiments, the link may be established by including a hash digest of the previous value proposal into the given value proposal. This is called a direct link. According to embodiments, the link may be established as a chain of links where one previous proposal is directly linked to a second previous proposal, etc. until it is directly linked to the given value proposal. In this case we say the first previous value proposal is indirectly linked to the given value proposal.

Such a validity check of features of the value proposal may improve the quality of the notarized value proposals. The validity check of features of the value proposal may be performed in addition to the check whether the parent value proposal has been fully notarized.

In this respect the term "quality" shall refer in particular to quality with respect to the semantics of the value proposals. As an example, if the value proposals are blocks of payment transactions, then a validity check by the notarization subset may be used to filter such double-spends out early, in particular before finalization according to embodiments.

According to embodiments, passing the validity check may require e.g. that the value proposal is made by a known node, that the value proposal contains a solution of a unique proof-of-work puzzle, that the value proposal comprises only valid transactions, that no transaction of the value proposal is in conflict with any transaction from a previous value proposal that the given value proposal directly or indirectly links to.

According to embodiments, the notarization subset may depend on the notarization round, i.e. the notarization subset may change from one notarization round to the next.

According to embodiments, the validity rule set may change over time.

This allows e.g. to adapt the distributed network to new or changed requirements, applications or needs in a flexible way.

According to embodiments, the validity check is performed by individual nodes of the notarization subset and these individual nodes may execute an individual notarization signature on a value proposal which is valid according to the validity rule set. In other words, if a value proposal has passed the validity check of an individual node, this node may execute an individual notarization signature on the value proposal. In this respect an individual notarization signature may be considered as comprising a signature that confirms that a value proposal has passed the validity check performed by the signing node.

According to embodiments, the individual nodes of the notarization subset execute individual notarization signatures on a subset of the value proposals which are valid according to the validity check.

In particular, individual nodes may execute individual notarization signatures for less than all value proposals that they are aware of and that are valid according to the validity rule set.

This may increase the success probability of the finality procedure. Therefore it may also increase the frequency of consensus incurring, i.e. indirectly also the average "speed" of consensus.

As an example, the fewer value proposals get an individual notarization signature, the fewer get fully notarized, the fewer ambiguities are present and hence the more likely it is that the finality procedure succeeds.

This may be in particular useful in combination with another embodiment of the invention which involves an assignment of ranks to block proposals.

According to such an embodiment, the distributed network may assign a rank to a block proposal. Such a rank may be assigned according to embodiments according to a node rank of the corresponding node. According to other embodiments, a rank may be assigned to a block proposal itself, i.e. where the rank is not derived from the corresponding node. As an example, just the hash of the block proposal may define the rank.

According to embodiments, the rank of a block proposal may depend on a randomness beacon. For example, the node rank of a corresponding node may depend on a randomness beacon.

According to embodiments, an individual node of the notarization subset may try to execute an individual notarization signature for a given notarization round only on one value proposal from the notarization round.

Such an embodiment may also be combined with the above mentioned ranking. More particularly, according to such an embodiment a node may execute an individual notarization signature only for the value proposal with the highest rank.

This may further increase the success probability of the finality procedure.

According to embodiments, a node may first wait for a waiting period to expire, which may be in the following denoted as timeout-period, then evaluate which of the value proposals received so far has the highest rank, then execute a notarization signature for that one.

A node may execute a second notarization signature only if it receives a value proposal of a higher rank than the last one already signed in the same notarization round.

In order to notarize a value proposal, a predefined notary rule set needs to be fulfilled according to embodiments. The predefined notary rule set may specify in particular that a predefined number of individual notarization signatures is required. For this the network, in particular the nodes of the notarization subset, may observe whether a value proposal fulfills this requirement. The predefined notary rule set may also be denoted as fourth rule set.

According to embodiments the individual notarization signatures may be communicated, in particular broadcasted within the network, in particular within the nodes of the notarization subset, e.g. by a gossip protocol. According to another embodiment the individual notarization signatures may be communicated to a central authority which collects the notarization signatures and performs the full notarization.

The predefined number of individual notarization signatures may depend on the security needs of the respective distributed network. Once a node has observed the predefined number of individual notarization signatures, it may notarize the corresponding value proposal and create a fully notarized value proposal. This may be done by internally marking (flagging) the corresponding value proposal.

According to embodiments this may comprise executing a recovery mechanism of a threshold signature scheme or an aggregation mechanism of a multi-signature scheme on the individual notarization signatures.

A corresponding signature for notarizing a value proposal and creating a fully notarized value proposal may be denoted as a full notarization signature according to embodiments.

According to embodiments, the full notarization of a value proposal may represent a confirmation of the notarization subset that the value proposal complies with the validity rule set, in particular that the corresponding parent value proposal has been fully notarized.

Accordingly, notarizing a value proposal may be defined according to embodiments as confirming, by the notarization subset, that the value proposal complies with the validity rule set.

According to embodiments, the full notarization of a value proposal may represent a confirmation of the notarization subset that the value proposal is considered to be the preferred one by the notarization subset.

At a further step, the nodes of the notarization subset perform a consistency check. According to embodiments, the consistency check is performed on value proposals from notarization rounds up to and including the current notarization round. The consistency check may be defined according to embodiments as a check whether the value proposals comply with a predefined consistency rule set. The consistency rule set is different from the validity rule set and it may be e.g. specified as part of the specification of the distributed network. The consistency rule set may specify in particular rules for a node of the notarization subset according to which the value proposals of one or more notarization rounds are considered to be consistent or not consistent with its own individual notarization signatures it has executed in the current notarization round. In this respect the consistency check for a given value proposal may be defined as a check which examines the relationship between the given value proposal and the value proposals that have been notary-signed individually by a node in the current notarization round.

According to an embodiment, the consistency rule set may specify that only value proposals which have been fully notarized may be considered as consistent. In other words, a node may only execute a consistency signature on fully notarized value proposals.

By implication of this rule, if a value proposal has received a certain minimum number of consistency signatures then the value proposal is automatically guaranteed to be notarized. The advantage of this may be that a network node outside the notarization subset can skip the validation of the fact that a value proposal is notarized. It is sufficient for the node to check that there are sufficiently many consistency signatures. This may reduce the overall validation work done by the distributed network. This may also enable validation by observers outside of the distributed network who do not have access to the notarization signatures.

According to an embodiment, a value proposal is considered to be consistent according to the consistency rule set if a respective node of the notarization subset has, in the current notarization round, not executed any individual notarization signature which is in conflict with the value proposal. According to such an embodiment, the consistency rule set may define in particular scenarios which are not considered to be consistent. Such scenarios which define conflicts may comprise e.g. ambiguities. As an example, if a respective node has notary-signed individually more than one value proposal in the current notarization round, this creates an ambiguity.

On the other hand, a value proposal of a current notarization round may be considered to be consistent according to the consistency rule set if a respective node of the notarization subset has executed in the current notarization round at most one individual notarization signature on any value proposal from the current notarization round and that individual notarization signature is for the value proposal.

In other words, a value proposal may be considered to be consistent according to the consistency rule set if a respective node of the notarization subset has not executed in the current notarization round an individual notarization signature on any value proposal different from the value proposal.

According to another embodiment, a value proposal of a previous notarization round may be considered to be consistent according to the consistency rule set if all value proposals for which a respective node of the notarization subset has executed an individual notarization signature in the current notarization round refer back to the value proposal of the previous notarization round.

"Referring back" may mean by virtue of a direct or indirect link established via the inclusion of a hash digest of a value proposal from a previous notarization round into a value proposal from a later notarization round.

According to an embodiment, the consistency rule set may define that a value proposal under consistency check is consistent from the perspective of a node of the notarization subset if all value proposals of the current notarization round for which the node has executed an individual notarization signature link back to the value proposal under consistency check, where the link back can be in one step (directly) or in multiple steps (indirectly).

According to such an embodiment, the term "previous notarization round" shall mean one or more of the previous notarization rounds. This may include the last notarization round, the second last notarization round, the third last notarization round and so on. In other words, according to such an embodiment a value proposal complies with the consistency rule set if it represents a common parent to all value proposals for which a respective node has executed an individual notarization signature in the current notarization round.

According to embodiments, the consistency-signed value proposals comprise the notarization round number to be finalized, the current notarization round number and the signing node. More particularly, the consistency check and the executed consistency signature is according to embodiments only valid for a specific pair of the current notarization round and the notarization round to be finalized.

According to embodiments, the distributed network, in particular the plurality of nodes, in particular the plurality of nodes of a next notarization round, may move to the next notarization round of the method once a fully notarized value proposal of a current notarization round has been observed. As mentioned above, the notarization subset may change from one notarization round to the next and a new notarization subset may use the observance of a fully notarized value proposal as trigger to start its notarization round.

According to embodiments, once a respective node has casted its consistency signatures, it may continue with the next notarization round, if the node is a member of the notarization subset of the next notarization round.

The finality procedure for a given notarization round may be executed in parallel to a subsequent notarization round.

During the finality procedure the distributed network, in particular the nodes of the notarization subset, observe whether a predefined finality rule set has been fulfilled for the value proposal.

According to an embodiment the finality rule set is fulfilled once a predefined number of consistency signatures has been observed for the value proposal. Accordingly, the nodes of the notarization subset, observe the number of consistency signatures which have been executed on the value proposals of non-finalized notarization rounds. A predefined number of consistency signatures is required in order to finalize a value proposal. Finalizing a value proposal shall mean according to embodiments that the distributed network or the notarization subset acting on behalf of the distributed network considers a value proposal final, i.e. that the notarization subset has agreed to add the value proposal to the sequence of values.

For this the network, in particular the nodes of the notarization subset, may observe whether a value proposal has received enough consistency signatures. According to embodiments the consistency signatures may be communicated, in particular broadcasted within the network, in particular within the nodes of the notarization subset, e.g. by a gossip protocol.

The predefined number of consistency signatures may depend on the security needs of the respective distributed network. Once a node has observed the predefined number of consistency signatures, it may finalize the corresponding value proposal and flag it as finalized value. This may be done according to embodiments by executing a threshold signature scheme, a multi-signature scheme or an aggregate signature scheme on the corresponding value proposal. The corresponding signature may be denoted as a finality signature. Such a finality signature represents a confirmation of the notarization subset that the value proposal is considered to be final and shall be added to the sequence of values.

According to another embodiment the finality rule set may be fulfilled for a value proposal only once a predefined number of consistency signatures has been observed for the value proposal and once the value proposal has been fully notarized. Hence two criteria have to be observed according to such an embodiment. The full notarization requires a number of individual notarization signatures which may be different from the required number of consistency signatures.

According to embodiments, the distributed network may not only finalize a value proposal that has received a required number of consistency signatures, but the distributed network or the notarization subset may also add to the sequence an implied sequence which is implied by that finalized value. Such an implied sequence may comprise all value proposals to which the finalized value proposal refers back. "Referring back" may mean by virtue of a direct or indirect link established via the inclusion of a hash digest of a value proposal from a previous notarization round into a value proposal from a later notarization round.

According to embodiments, the finality procedure may not be successful for a given notarization round. More particularly, finalization may fail for all value proposals of a given notarization round, e.g. if the required number of consistency signatures is not reached. This is by design according to embodiments. More particularly, one value proposal of the notarization round will get added to the sequence of values later by being part of an implied sequence.

An advantage of embodiments of the invention is that if, for a given notarization round, no value proposal gets finalized, then a subsequent notarization round can still proceed unhindered.

An advantage of embodiments of the invention is that if, for a given notarization round, the finalization of a value proposal is slow or delayed, then a subsequent notarization round can still proceed, asynchronously, without having to wait for a value proposal of the given notarization round to be finalized.

According to an embodiment, the network may be configured for a respective security assumption or security need of the network. More particularly, the distributed network may be designed for a security assumption that in every notarization subset at most f nodes are Byzantine, while the rest is honest.

According to embodiments the network may then be configured to select a number n of the nodes of the notarization subsets, a predefined number t1 of individual notarization signatures required to notarize a value proposal and to create a fully notarized value proposal and a predefined number t2 of consistency signatures required to fulfill the finality rule set and to finalize a value proposal according to the equation as follows:

$$t1+t2>n+f.$$

Such an embodiment allows to tune the predefined numbers t1 and t2 and the number n of the nodes of the notarization subset in view of the respective security needs or assumptions of the network. In particular, such an embodiment may guarantee a successful finality procedure for different security assumptions of the network.

According to an embodiment of another aspect of the invention, a computer-implemented method for reaching a consensus on as sequence of values, in particular on blocks to be written to a blockchain, is provided.

According to an embodiment of another aspect of the invention, a node of a distributed network is provided.

According to an embodiment of another aspect of the invention, a computer program product for operating a distributed network is provided. The computer program product comprises a computer readable storage medium having program instructions embodied therewith, the program instructions executable by one or more of a plurality of nodes of the distributed network to cause the one or more of the plurality of nodes to perform steps of the method aspect of the invention.

According to an embodiment of another aspect of the invention, a software architecture encoded on a non-transitory computer readable medium is provided. The software architecture is configured to operate one or more nodes of a distributed network. The encoded software architecture comprises program instructions executable by one or more of the plurality of nodes to cause the one or more of the plurality of nodes to perform a method comprising steps of the method aspects of the invention.

Features and advantages of one aspect of the invention may be applied to the other aspects of the invention as appropriate.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein.

MODES FOR CARRYING OUT THE INVENTION

At first, some general aspects and terms of embodiments of the invention will be introduced.

According to embodiments, a distributed network comprises a plurality of nodes that are arranged in a distributed fashion. In such a distributed network computing, software and data is distributed across the plurality of nodes. The nodes establish computing resources and the distributed network may use in particular distributed computing techniques.

According to embodiments, distributed networks may be embodied as blockchain networks. The term "blockchain" shall include all forms of electronic, computer-based, distributed ledgers.

Figure 1:
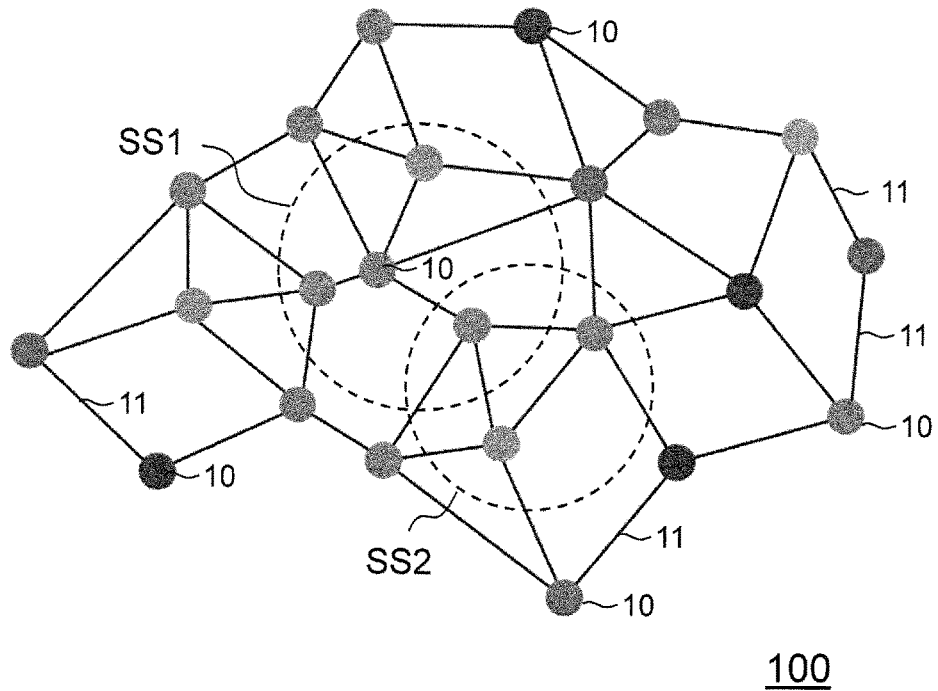
FIG. 1 shows an exemplary diagram of a distributed network according to an embodiment of the invention.

FIG. 1 shows an exemplary block diagram of a distributed network 100 according to an embodiment of the invention.

The distributed network 100 comprises a plurality of nodes 10, which may also be denoted as network nodes 10 or computing nodes 10. Each of the plurality of nodes 10 is configured to run one or more computational units. According to embodiments a computational unit shall be understood as a piece of software, in particular as a piece of software that comprises or has its own unit state.

The plurality of nodes 10 of the network 100 may be allocated to different subsets and/or subnets. Such allocations may change over time.

According to this embodiment, the network 100 comprises a consensus subset SS1 of nodes 10 and an execution subset SS2 of nodes 10.

The computational units that run on the nodes 100 can be used by a user of the network 100 to perform or request computational tasks or services, in particular application services. The computational units of the network 100 may execute in particular execution messages from a current set of execution messages. The execution messages may comprise in particular unit-to-unit messages which are exchanged between the computational units of the network and/or ingress messages, i.e. messages which are received from external sources, in particular from users of the network. The network 100 is configured such that at first a consensus protocol is performed to reach a consensus on a selection and processing order of execution messages from a respective current set of execution messages. Depending on the number of nodes 10 in the network 100, the consensus protocol is advantageously not performed by all nodes of the network, but by only a subset of the nodes 10 of the network 100, which is in the following denoted as consensus subset SS1. The consensus subset SS1 may also be denoted as consensus subset. The nodes of the consensus subset SS1 are accordingly configured to run the consensus protocol to reach a consensus on a selection and processing order of execution messages from the current set of execution messages.

The execution of the execution messages may also advantageously not be performed by all nodes of the network 100, but only by a subset of the nodes 10 of the network 100. This subset is in the following denoted as execution subset SS2 and may be also denoted as execution subset SS2.

The computational units of the execution subset SS2 then execute individually the selection of the execution messages in the processing order as agreed in the previous consensus step. Each of the computational units of the execution subset SS2 performs the execution in a deterministic manner and thereby mutates the unit states of the corresponding computational units of the execution subset SS2.

According to embodiments, a unit state shall be understood as all the data or information that is used by the computational unit, in particular the data that the computational unit stores in variables, but also data which the computational units get from remote calls. The unit state may represent in particular storage locations in the respective memory locations of the respective node. The contents of these memory locations, at any given point in the execution of the computational units, is called the unit state according to embodiments. The computational units may be in particular embodied as stateful computational units, i.e. the computational units are designed according to embodiments to remember preceding events or user interactions.

According to embodiments it is assumed that each node of the network keeps a local clock that is roughly synchronized with the clocks of the other nodes.

Figure 2:
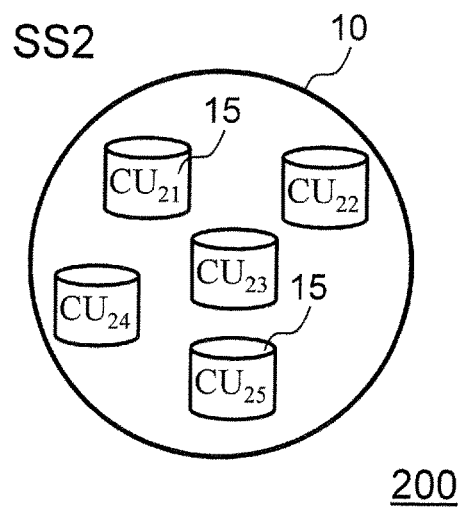
FIG. 2 illustrates in a more detailed way computational units running on an exemplary node of the network.

FIG. 2 illustrates in a more detailed way computational units 15 running on nodes 10 of the network 100. More particularly, FIG. 2 shows a node 10 of the subset SS2 of FIG. 1 on which five computational units 15 are run, more particularly the set of computational units $CU_{21}$, $CU_{22}$, $CU_{23}$, $CU_{24}$ and $CU_{25}$. The set of computational units $CU_{21}$, $CU_{22}$, $CU_{23}$, $CU_{24}$ and $CU_{25}$ runs on each node 10 of the subset SS2. Furthermore, the set of computational units $CU_{21}$, $CU_{22}$, $CU_{23}$, $CU_{24}$ and $CU_{25}$ is replicated across the whole subset SS2 such that each of the computational units $CU_{21}$, $CU_{22}$, $CU_{23}$, $CU_{24}$ and $CU_{25}$ eventually has the same unit state, provided they behave honestly. This may be implemented in particular by performing an active replication in space of the unit state of the computational units $CU_{21}$, $CU_{22}$, $CU_{23}$, $CU_{24}$ and $CU_{25}$ on each of the nodes 10 of the subset SS2.

The computational units CU may serve different functions and may be of different types. One type of computational units are application computational units which are configured to provide application services to users of the distributed network. The application computational units will be in the following denoted as application units or AUs for simplicity reasons. Another type of computational units are wallet computational units which may be configured to manage user currency accounts of users of the network. And yet another type of computational units are system computational units. Such system computational units may provide system or managing functions for the distributed network.

Figure 3:
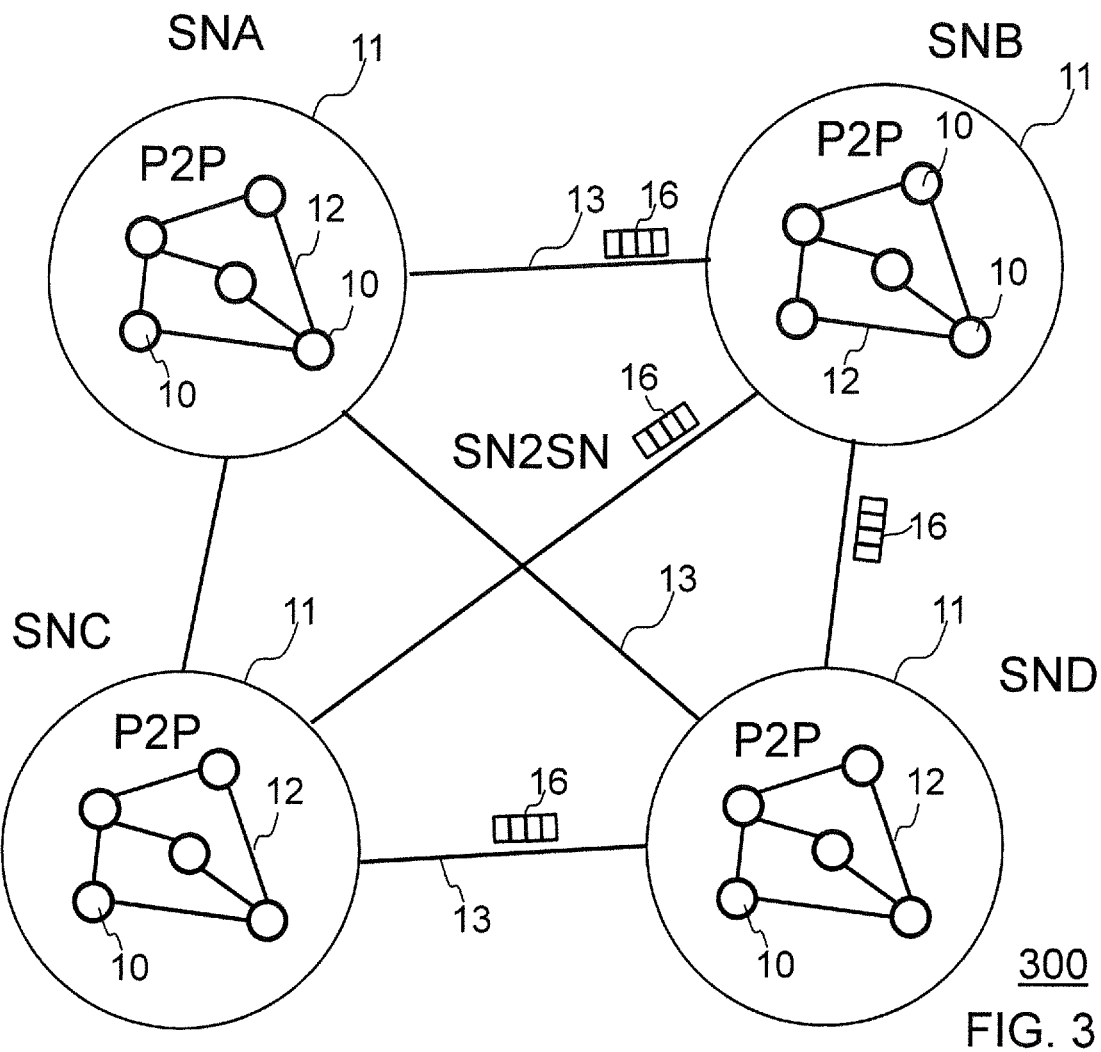
FIG. 3 shows an exemplary diagram of a distributed network according to an embodiment of the invention comprising a plurality of subnets.

FIG. 3 shows an exemplary block diagram of a distributed network 300 according to an embodiment of the invention.

The distributed network 300 comprises a plurality of nodes 10.

According to this embodiment, the plurality of nodes 10 are distributed over a plurality of subnets 11. In the example of FIG. 1, four subnets 11 denoted with SNA, SNB, SNC and SND are provided. The network 100 comprises communication links 12 for intra-subnet communication within the respective subnet 11 as well as communication links 13 for inter-subnet communication between different ones of the subnets 11. Accordingly, the communication links 12 may also be denoted as intra-subnet or Peer-to-Peer (P2P) communications links and the communication links 13 may also be denoted as inter-subnet or Subnet-to-Subnet (SN2SN) communications links.

Each of the plurality of subnets 11 is configured to run a set of computational units on each node 10 of the respective subnet 11.

According to embodiments of the invention the subnets 11 are configured to replicate the set of computational units across the respective subnet 11. More particularly, the subnets 11 are configured to replicate the unit state of the computational units across the respective subnet 11.

The distributed networks 100 and 300 may be in particular embodied as networks which are configured to run asynchronous BFT consensus protocols. For such networks it is assumed that less than ⅓ (a third) of the nodes in each subnet are corrupt so that artifacts generated and signed by the subnet can be fully trusted.

Figure 4:
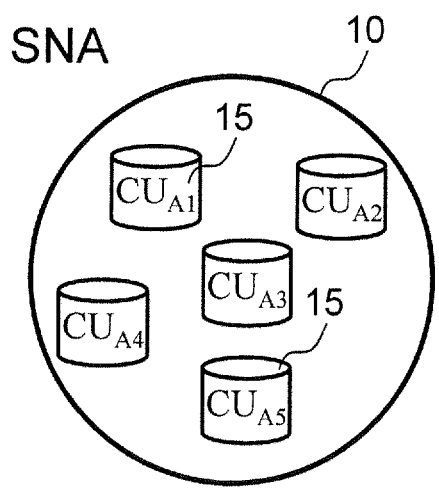
FIG. 4 illustrates in a more detailed way computational units running on the distributed network of FIG. 3.
Figure 4:
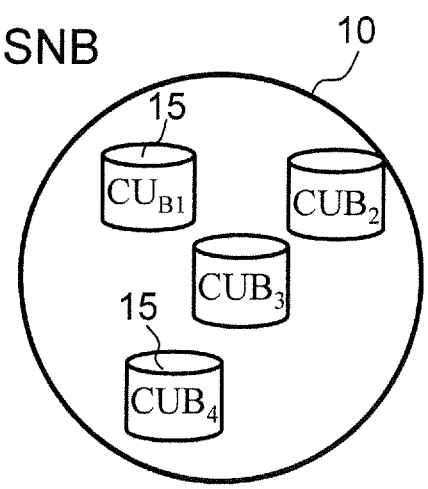

FIG. 4 illustrates in a more detailed way computational units 15 running on nodes 10 of the network 300. More particularly, FIG. 2 shows on the left side 401 a node 10 of the subset SNA of FIG. 1 on which five computational units 15 are run, more particularly the set of computational units $CU_{A1}$, $CU_{A2}$, $CU_{A3}$, $CU_{A4}$ and $CU_{A5}$. The set of computational units $CU_{A1}$, $CU_{A2}$, $CU_{A3}$, $CU_{A4}$ and $CU_{A5}$ runs on each node 10 of the subnet SNA. Furthermore, the set of computational units $CU_{A1}$, $CU_{A2}$, $CU_{A3}$, $CU_{A4}$ and $CU_{A5}$ is replicated across the whole subnet SNA such that each of the computational units $CU_{A1}$, $CU_{A2}$, $CU_{A3}$, $CU_{A4}$ and $CU_{A5}$ has the same unit state. This may be implemented in particular by performing an active replication in space of the unit state of the computational units $CU_{A1}$, $CU_{A2}$, $CU_{A3}$, $CU_{A4}$ and $CU_{A5}$ on each of the nodes 10 of the subnet SNA.

Furthermore, FIG. 4 shows on the right side 402 a node 10 of the subnet SNB of FIG. 1 on which four computational units 15 are run, more particularly the set of computational units $CU_{B1}$, $CU_{B2}$, $CU_{B3}$ and $CU_{B4}$. The set of computational units $CU_{B1}$, $CU_{B2}$, $CU_{B3}$ and $CU_{B4}$ runs on each node 10 of the subnet SNB. Furthermore, the set of computational units $CU_{B1}$, $CU_{B2}$, $CU_{B3}$ and $CU_{B4}$ is replicated across the whole subnet SNB such that each of the computational units $CU_{B1}$, $CU_{B2}$, $CU_{B3}$ and $CU_{B4}$ has the same unit state, e.g. by performing an active replication in space of the unit state as mentioned above.

Referring back to FIG. 3, the network 300 is configured to exchange inter-subnet messages 16 between the subnets SNA, SNB, SNC and SND via a messaging protocol and a consensus protocol. The consensus protocol is configured to reach a consensus on the processing order of the inter-subnet messages 16 at the respective receiving subnet. Referring e.g. to the subnet SNB, it receives inter-subnet messages 16 from the subnets SNA, SNC and SND. The consensus protocol receives and processes these inter-subnet messages 16 and performs a predefined consensus algorithm or consensus mechanism to reach a consensus on the processing order of the received inter-subnet messages 16.

According to embodiments, the network 300 may be configured to run the consensus protocol separately on each subnet. In other words, each of the subnets SNA, SNB, SNC and SND run its own consensus protocol separately and independently from the other subnets. Accordingly, each of the subnets SNA, SNB, SNC and SND can decide, to a predefined extent, on its own and independently from the other subnets which received messages to process and in which order. Hence each of the subnets SNA, SNB, SNC and SND reaches a consensus on a per-subnet basis on the processing order of the received inter-subnet messages 16. Such a consensus may also be considered as a local consensus or a subnet-consensus.

This concept is illustrated in more detail with reference to FIG. 5.

Figure 5:
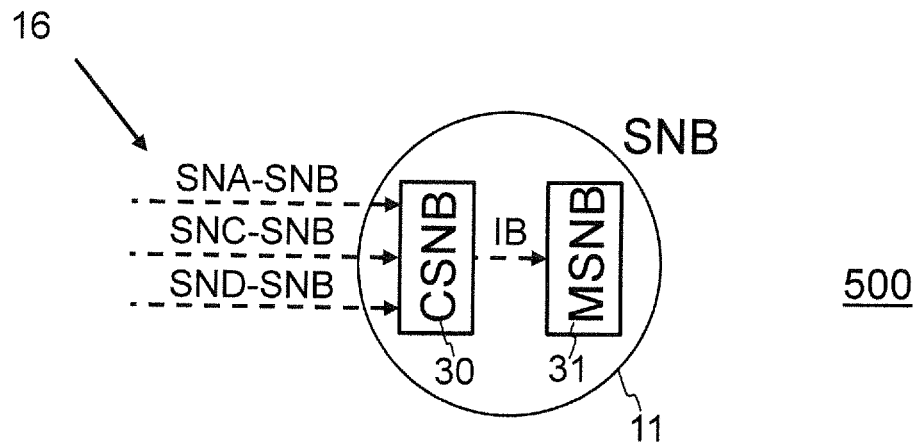
FIG. 5 shows a schematic illustration of inter-subnet messages which are received at a subnet of the network of FIG. 3.

FIG. 5 shows a schematic illustration of inter-subnet messages 16 which are received at the subnet 11, SNB of FIG. 3

The subnet SNB receives inter-subnet messages SNA-SNB from the subnet SNA, inter-subnet messages SNC-SNB from the subnet SNC and inter-subnet messages SND-SNB from the subnet SND. These pool of inter-subnet messages is processed by a consensus component 30, CSNB which runs locally a consensus protocol on the subnet SNB. Hence the consensus component 30 may be denoted as subnet consensus component.

The consensus component 30 generates a queue of input blocks IB from the inter-subnet messages according to a predefined consensus algorithm or mechanism and provides the queue of input blocks IB to a messaging component 31, MSNB which is configured to run a messaging protocol and to further process the input blocks IB.

According to embodiments each of the nodes 10 of a respective subnet 11 may participate in the consensus protocol. According to such embodiments, each of the subnets 11 may comprise e.g. 10 to 100 nodes, in particular 20 to 50 nodes. Such numbers may provide an advantageous compromise between security and efficiency.

According to other embodiments, the consensus protocol may be configured to elect members of a committee from the plurality of nodes 10 of the respective subnet 11 according to a predefined election scheme and to perform the consensus protocol only with the elected members of the committee. Such an approach is in particular useful for subnets with a larger number of nodes, e.g. for subnets with 1000 or more nodes.

Figure 6:
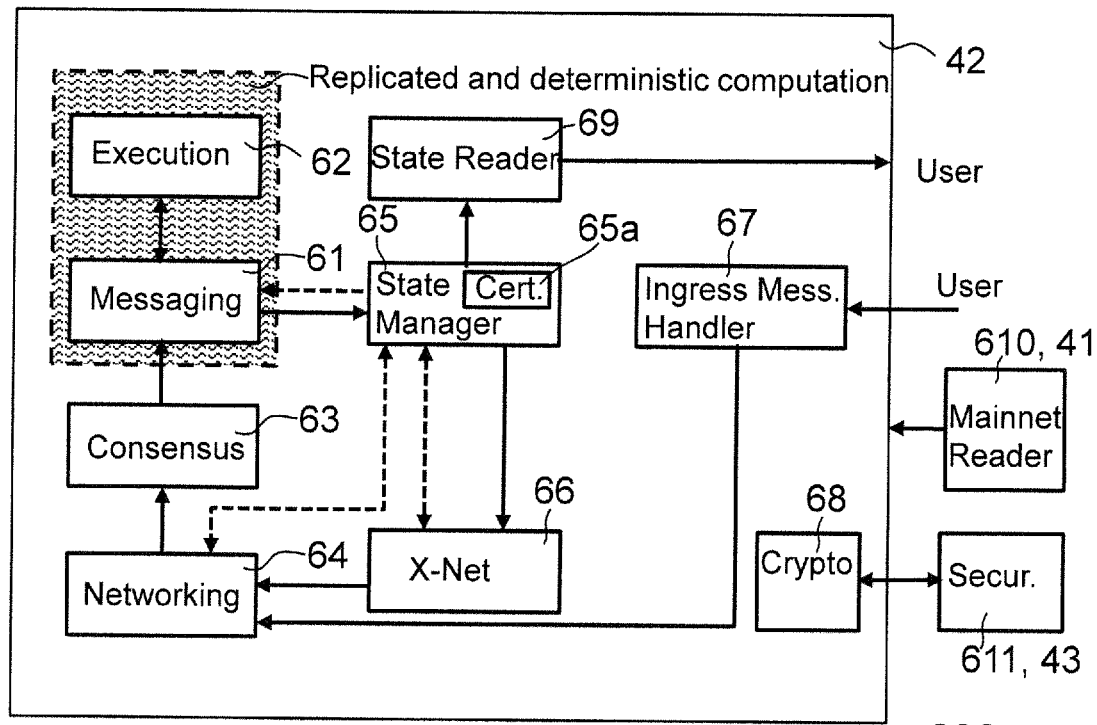
FIG. 6 shows a schematic block diagram of protocol components of a subnet protocol client.
Figure 16:
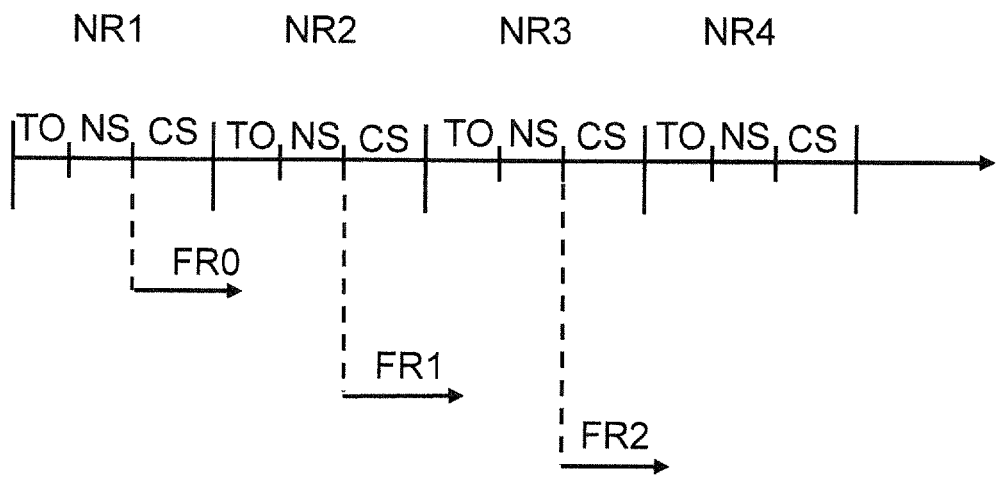
FIG. 16 shows an exemplary timing diagram of periods of the notarization rounds and the finalization rounds according to another embodiment of the invention.

FIG. 6 shows a schematic block diagram of protocol components 600 of a subnet protocol client, e.g. of the subnet protocol client 42 as shown in FIG. 16.

Full arrows in FIG. 6 are related to execution messages which comprises unit-to-unit messages and ingress messages. Ingress messages may be in particular mutating-queries from a user. Dashed arrows relate to system information.

The protocol components 600 comprise a messaging component 61 which is configured to run the messaging protocol and an execution component 62 configured to run an execution protocol for executing execution messages, in particular for executing unit-to-unit messages and/or mutating queries. The protocol components 600 further comprise a consensus component 63 configured to run a consensus protocol, a networking component 64 configured to run a networking protocol, a state manager component 65 configured to run a state manager protocol, an X-Net component 66 configured to run a cross-subnet transfer protocol and an ingress message handler component 67 configured to handle ingress messages received from an external user of the network. The protocol components 600 comprise in addition a crypto component 68. The crypto component 68 cooperates with a security component 611, which may be e.g. embodied as the security application 43 as will be described subsequently with reference to FIG. 16. The protocol components 600 further comprise a state reader component 69 which is configured to receive read queries or in other word read requests from a user.

The state reader component 69 is configured to cooperate with the state manager component 65.

The read queries which are received and handled by the state reader component 69 are in particular embodied as non-mutating queries, i.e. they do not change persistently the unit state of the computational units. On the other hand, the ingress messages which are received from the ingress message handler component 67 and go through the consensus component 63, may be in particular embodied as mutating queries, i.e. they change the unit state of the respective computational unit that is executing the mutating query. As the read queries do not have to go through the consensus component 63, they can be made asynchronously on any node of the respective subnet and can hence be much faster.

Furthermore, the subnet-protocol client 42 may cooperate with a reader component 610, which may be a part of the mainnet protocol client 41 as described with reference to FIG. 9. The mainnet reader component 610 may provide information that is stored and distributed by the mainnet to the respective subnet protocol client 42. This includes the assignment of nodes to subnets, node public keys, assignment of computational units to subnets etc.

The messaging component 61 and the execution component 62 are configured such that all computation, data and state in these components is identically replicated across all nodes of the respective subnet, more particularly all honest nodes of the respective subnet. This is indicated by the wave-pattern background of these components.

Such an identical replication is achieved according to embodiments on the one hand by virtue of the consensus component 63 that ensures that the stream of inputs to the messaging component 61 is agreed upon by the respective subnet and thus identical for all nodes, more particularly by all honest nodes. On the other hand, this is achieved by the fact that the messaging component 61 and the execution component 62 are configured to perform a deterministic and replicated computation.

The X-Net Transfer component 66 sends message streams to other subnets and receives message streams from other subnets.

Most components will access the crypto component 68 to execute cryptographic algorithms and the mainnet reader 610 for reading configuration information.

The execution component 62 receives from the messaging component 61 a unit state of the computational unit and an incoming message for the computational unit, and returns an outgoing message and the updated unit state of the computational unit. While performing the execution, it may also measure a gas or fuel consumption of the processed message (query).

The messaging component 61 is clocked by the input blocks received from the consensus component 63. That is, for each input block, the messaging component 61 performs steps as follows. It parses the respective input blocks to obtain the messages for its computational units. Furthermore, it routes the messages to the respective input queues of the different computational units and schedules, by a scheduler, messages to be executed according to the capacity each computational unit got assigned. Then it uses the execution component 62 to process a message by the corresponding computational unit, resulting in messages to be sent being added to an output queue of the respective computational unit. However, when the message is destined to a computational unit on the same subnet it may be put directly in the input queue of the corresponding computational unit. The messaging component 61 finally routes the messages of the output queues of the computational units into message streams for subnets on which the receiving computational units are located and forwards these message streams to the state manager component 65 to be certified, i.e., signed by the respective subnet.

The state manager component 65 comprises a certification component 65a. The certification component 65a is configured to certify the output streams of the respective subnet. This may be performed e.g. by a group signature of the computational units of the respective subnet.

The certification component 65a may be further configured to certify certain variables of the unit state, in particular certain variables of snapshots of the unit state as will be described below in more detail.

Figure 7:
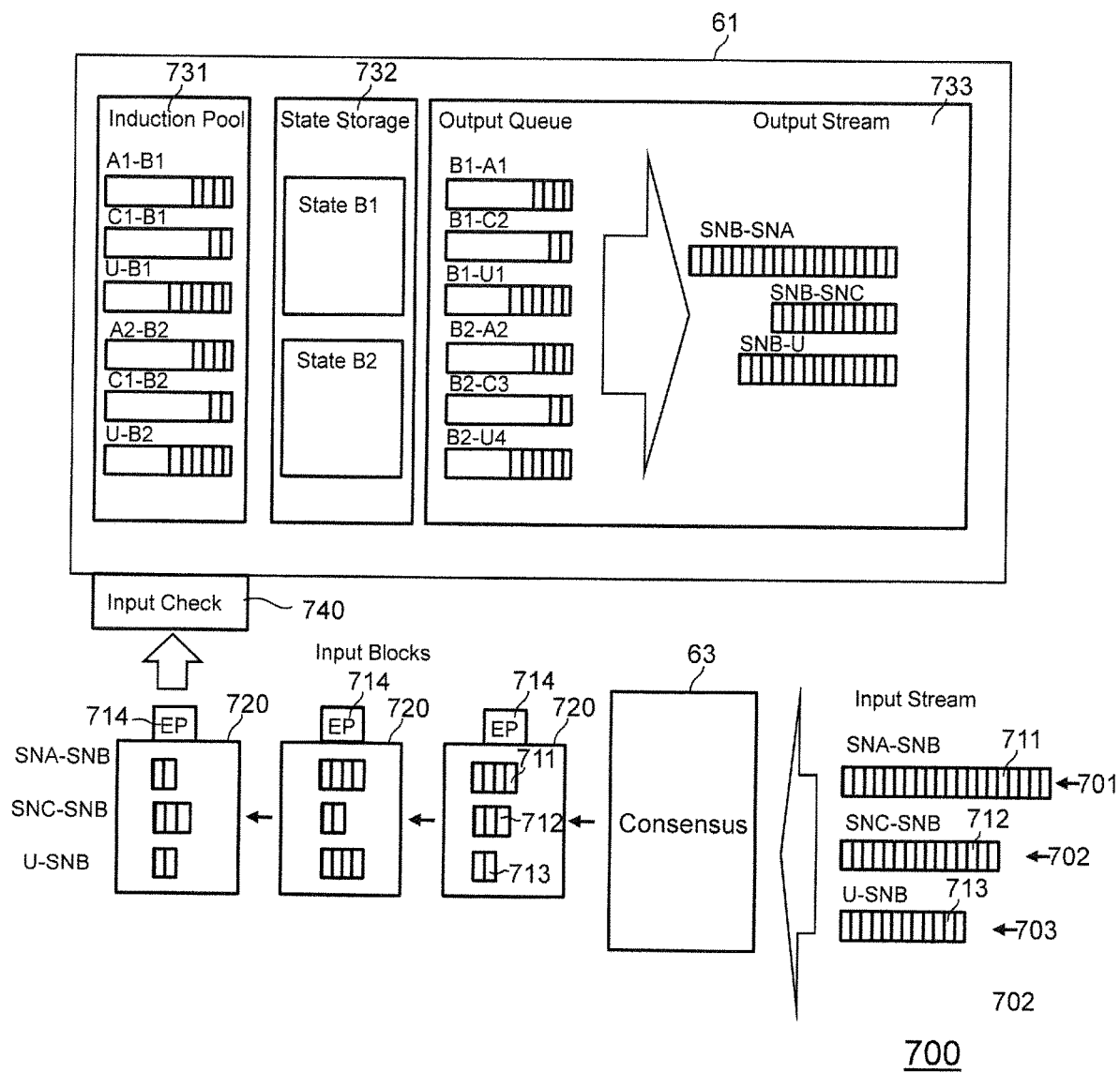
FIG. 7 shows an exemplary visualization of a workflow of the messaging protocol and the consensus protocol and the associated components.

FIG. 7 shows an exemplary visualization of a workflow 700 of the messaging protocol and the consensus protocol and the associated components, e.g. of the messaging component 61 and the consensus component 63 of FIG. 6. More particularly, FIG. 7 visualizes the workflow of inter-subnet messages exchanged between a subnet SNB and subnets SNA and SNC. Furthermore, the subnet SNB exchanges ingress messages with a plurality of users U.

Starting from the bottom right of FIG. 7, a plurality of input streams 701, 702 and 703 is received by a consensus component 63. The consensus component 63 is a subnet consensus component that is run by a subnet client of the subnet SNB. The input stream 701 comprises inter-subnet messages 711 from the subnet SNA to the Subnet SNB. The input stream 702 comprises inter-subnet messages 712 from the subnet SNC to the Subnet SNB. The input stream 703 comprises ingress messages 713 from the plurality of users U to the subnet SNB.

The inter-subnet messages 711 and 712 comprise unit-to-unit messages to be exchanged between the computational units of the different subnets as well as signalling messages. The signalling messages are used to acknowledge or not acknowledge a receipt of unit-to-unit messages. The messaging component 61 is configured to send the signalling messages from a receiving subnet to a corresponding sending subnet, i.e. in this example from the subnet SNB to the subnets SNA and SNC. The messaging component 61 is according to this example configured to store the sent unit-to-unit messages until an acknowledgement message has been received for the respective unit-to-unit message. This provides a guaranteed delivery.

The consensus component 63 is configured to receive and process the inter-subnet messages 711, 712 of the subnets SNA, SNC and the ingress messages 713 of the users U and to generate a queue of input blocks 720 from the inter-subnet messages 711, 712 and the ingress messages 713 according to a predefined consensus mechanism that is executed by the corresponding consensus protocol. Each input block 720 produced by consensus contains a set of ingress messages 713, a set of inter-subnet messages 711, 712 and execution parameters 714, EP. The execution parameters 714, EP may include in particular a random seed, a designated execution time and/or a height index. The consensus component 63 may also vary the number of messages in every input block based on the current load of the subnet.

The consensus component 63 provides the queue of input blocks 720 then to the messaging component 61 which is configured to execute the messaging protocol and to process the input blocks 720.

The messaging protocol and the messaging component 61 are clocked by the input blocks 720 received from the consensus component 63.

Before processing the received input blocks, the messaging component 61 may perform one or more pre-processing steps including one or more input checks. The input checks may be performed by an input check component 740.

The input checks may be performed with different granularity according to embodiments. At first, the input checks may be performed for the whole input block. Such checks may also be denoted as input block checks. These may comprise a check of the height of the next input block. If the height of the next input block is lower than expected next in sequence, then it is discarded. If the input block is not the expected next in sequence, then the messaging component 61 may trigger a node catch up protocol. If the input block is the next in sequence, then it is further processed by the messaging component 61.

The different types of messages (signalling messages, ingress messages, unit-to-unit messages) in the input blocks may be grouped together.

The input checks may further comprise an overload check to check whether the messaging component is currently overloaded and does not have enough capacity to perform the processing. If e.g. the relevant queue in the induction pool is full, the corresponding message may be rejected. Further input checks may comprise an in-order delivery check. To satisfy the in-order delivery requirement, messages can be annotated e.g. with sequence numbers. If a message with a sequence number is received, the messaging component 61 may check whether it has the expected number, and if not, may reject it. Furthermore, the input check component 740 may perform a validity check of the target destination, i.e. whether a message targets a computational unit that is active on the corresponding subnet.

If the input checks have been passed successfully, the messages of the respective input block 720 may be further processed by the messaging component 61 and the corresponding messages may be appended to a corresponding queue in an induction pool of an induction pool component 731. The induction pool component 731 of the messaging component 61 receives input blocks and input messages that have been successfully passed the input check component 740 and have accordingly been accepted by the messaging component 61 for further processing.

In general, the messaging component 61 pre-processes the input blocks 720 by placing ingress messages, signalling messages and inter-subnet messages into the induction pool component 731 as appropriate. Signalling messages in the incoming subnet streams are treated as acknowledgements of messages of the output queues which can then be purged.

In this example, the induction pool component 731 comprises unit-to-unit queues A1-B1, C1-B1, A2-B2 and C1-B2 as well as user-to-unit queues U-B1 and U-B2.

Following these pre-processing steps, the messaging component 61 invokes the execution component 62 (see FIG. 6) to execute as much of the induction pool as is feasible during a single execution cycle, providing the designated execution time and the random seed as additional inputs. Following the execution cycle, a resulting output queue of messages is fed to an output queue component 733. Initially the output queue component 733 comprises unit-to-unit and unit-to-user output queues, in this example the unit-to-unit output queues B1-A1, B1-C2, B2-A2 and B2-C3 and the unit-to-user output queues B1-U1 and B2-U4. As an example, the messages B1-A1 denote messages from the computational unit B1 of subnet SNB to the computational unit A1 of subnet SNA. As another example, the messages B1-U1 denote messages from the computational unit B1 of subnet SNB to the user U1.

The output queue component 733 post-processes the resulting output queue of the messages by forming a set of per-subnet output streams to be certified, e.g. by the certification component 65a as shown in FIG. 6, and disseminated by other components. In this example, the per-subnet output streams SNB-SNA, SNB-SNC and SNB-U are provided.

The messaging component 61 further comprises a state storage component 732 that is configured to store the state/unit state of the computational units of the respective subnet, in this example the states of the computational units B1 and B2 of the subnet SNB. The corresponding unit state is the working memory of each computational unit.

The messaging component 61 revolves around mutating certain pieces of system state deterministically. In each round, the execution component 61 will execute certain messages from the induction pool by reading and updating the state of the respective computational unit and return any outgoing messages the executed computational unit wants to send. These messages go into the output queue component 733, which initially contains unit-to-user messages and unit-to-unit messages between computational units of the network. While intra-subnet messages between computational units of the same subnet may be routed and distributed internally within the respective subnet, inter-subnet messages are routed into output streams sorted by subnet-destinations.

In addition, two pieces of state may be maintained according to embodiments to inform the rest of the system about which messages have been processed. A first piece may be maintained for inter-subnet messages and a second piece of state for ingress messages.

Figure 8:
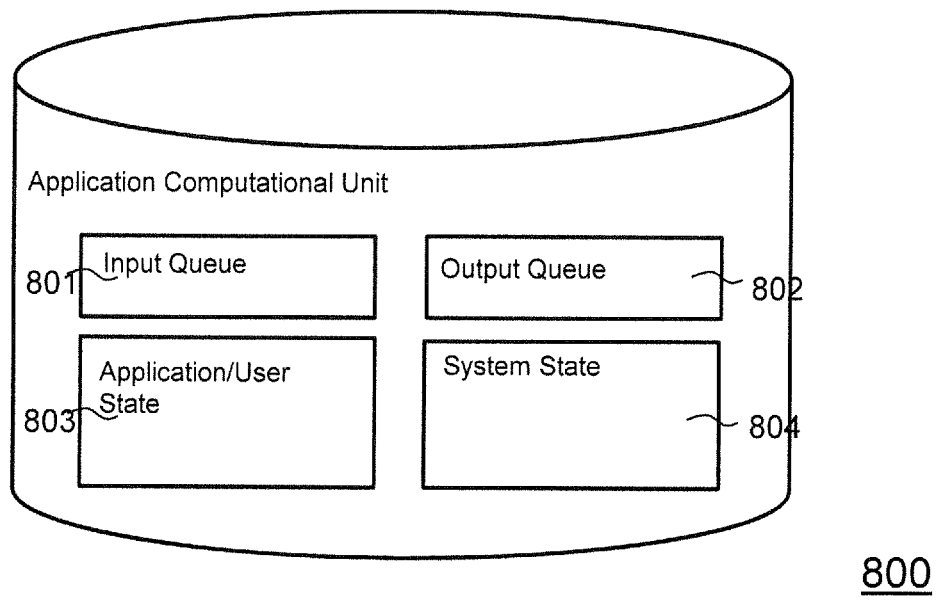
FIG. 8 shows a more detailed illustration of an application unit according to an embodiment of the invention.

FIG. 8 shows an exemplary application (computational) unit 800 according to an embodiment of the invention.

The application unit 800 comprises an input queue 801, an output queue 802, a user or application state 803 and a system state 804.

All input queues 801 of the application units (on a given subnet) collectively make up the induction pool, but the input queues are part of the state of the application computational unit. The output queues 802 contain messages that need to be delivered to other application computational units, possibly on other subnetworks.

The application state 803 comprises a main Web Assembly (Wasm) module which implements the functionality of the application computational unit and its dependent modules, together with an instance of each of the modules. A Wasm module instance consists of memories, global variables and tables.

The system state 804 cannot be freely modified by code of the application computational unit. It includes meta-data, other state maintained by system on behalf of the application computational units, notably the compiled form of the Wasm modules, and context and callbacks for outstanding messages.

Figure 9:
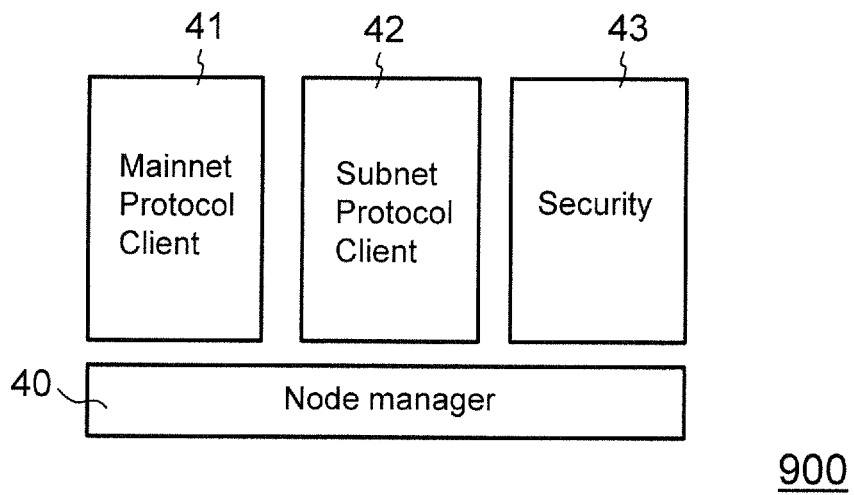
FIG. 9 illustrates main processes which are run on each node of the network according to an embodiment of the invention.

FIG. 9 illustrates main processes which are run on each node 10 of the networks 100 and 300 according to an embodiment of the invention. A network client of networks according to embodiments of the invention is the set of protocol components that are necessary for a node 10 to participate in the network. According to embodiments, each node 10 is a member of a mainnet and typically one subnet, which means that each node runs a client for the mainnet and possibly a client for the subnet.

A node manager 40 is configured to start, re-start and update a mainnet protocol client 41, a subnet protocol client 42 and a security application 43.

According to embodiments, each of the plurality of subnets 11 is configured to run a separate subnet protocol client 42 on its corresponding nodes 10. The mainnet protocol client 41 is in particular configured to distribute configuration data to and between the plurality of subnets 11. The mainnet protocol client 41 may be in particular configured to run only system computational units, but not any user-provided computational units. The mainnet protocol client 41 is the local client of the mainnet and the subnet protocol client 42 is the local client of the subnet.

The security application 43 stores secret keys of the nodes 10 and performs all operations with them.

The security application 43 is configured to protect the secret keys held by a node. More particularly, the secret keys are held and processed in a separate execution environment (either a separate process or a separate virtual machine (VM)). The security application 43 is configured to operate with limited and controlled interfaces such that the secret keys cannot be extracted via these interfaces. According to embodiments, the security application is configured to operate like a hardware security module (HSM) or similar to a HSM. Hence the security application 43 may be denoted as a Software HSM.

Figure 10:
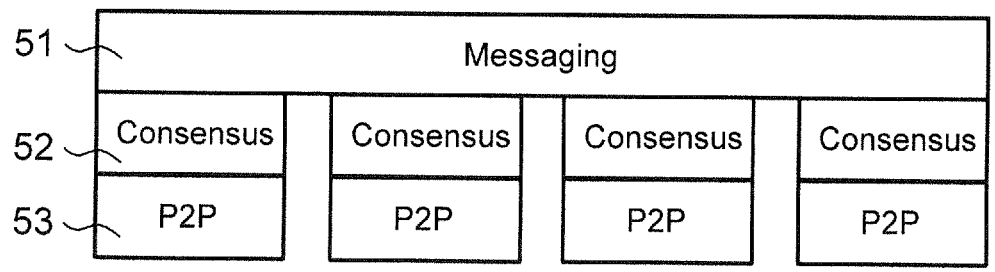
FIG. 10 shows a layer model illustrating main layers which are involved in the exchange of inter-subnet and intra-subnet messages.

FIG. 10 shows a layer model 1000 illustrating main layers which are involved in the exchange of inter-subnet and intra-subnet messages. The layer model 1000 comprises a messaging layer 51 which is configured to serve as an upper layer for the inter-subnet communication. More particularly, the messaging layer 51 is configured to route inter subnet messages between computational units of different subnets. Furthermore, the messaging layer 51 is configured to route ingress messages from users of the network to computational units of the network.

The layer model 1000 further comprises a plurality of consensus layers 52 which are configured to receive inter-subnet messages from different subnets as well as ingress messages and to organize them, in particular by agreeing on a processing order, in a sequence of input blocks which are then further processed by the respective subnet.

The consensus-layer 52 may be in particular configured to perform a method for reaching a consensus on a sequence of values as described above and below. In this respect, the sequence of values may be embodied as the above mentioned sequence of input blocks.

In addition, the layer model 1000 comprises a peer-to-peer (P2P) layer 53 that is configured to organize and drive communication between the nodes of a single subnet.

According to embodiments, the network may comprise a plurality of further layers, in particular an execution layer which is configured to execute execution messages on the computational units of the network.

In the following the interactions between the mainnet protocol clients 41 and the subnet protocol clients is described in more detail. The mainnet protocol clients 41 manage a number of registries that contain configuration information for the subnets. These registries are implemented by computational units on the mainnet and, as all nodes are participating in the mainnet, access to these registries can simply be implemented by a state read operation.

That is, the mainnet reader 610 (see FIG. 6) may be in fact a sub-component of the mainnet protocol client 41 and therefore interaction with this component results in interaction between the two isolated environments in which the mainnet and subnet clients run.

Figure 11:
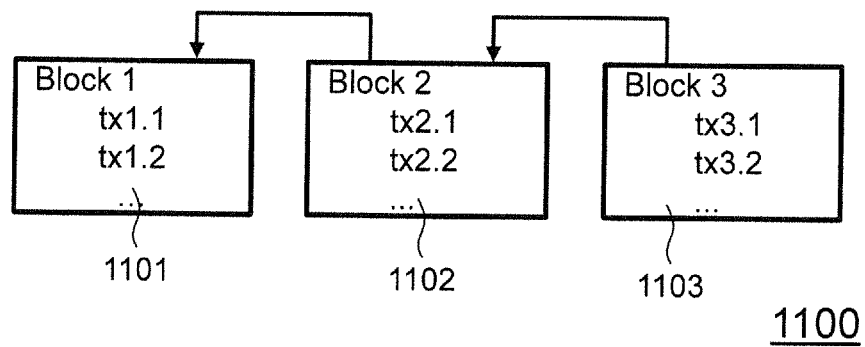
FIG. 11 illustrates the creation of input blocks by a consensus component according to an exemplary embodiment of the invention.

FIG. 11 illustrates the creation of blocks in distributed networks according to embodiments of the invention. The blocks may be in particular the input blocks 720 shown in FIG. 7 which are created by the consensus component 63 that runs the consensus protocol, in particular a local subnet consensus protocol.

In this exemplary embodiment three input blocks 1101, 1102 and 1103 are illustrated. Block 1101 comprises a plurality of transactions, namely the transactions tx1.1, tx1.2 and possibly further transactions indicated with dots. Block 1102 comprises also a plurality of transactions, namely the transactions tx2.1, tx2.2 and possibly further transactions indicated with dots. Block 1103 also comprises a plurality of transactions, namely the transactions tx3.1, tx3.2 and possibly further transactions indicated with dots. The input blocks 1101, 1102 and 1103 are chained together. More particularly, each of the blocks comprises a block hash of the previous block. This cryptographically ties the current block to the previous block(s).

According to embodiments the transactions may be inter-subnet messages, ingress messages and signalling messages.

The input blocks 1101, 1102 and 1103 establish a blockchain 1100. According to embodiments, the input blocks 1101, 1102 and 1103 may be created by a method for reaching a consensus on a sequence of values as described above and below.

Accordingly, the input blocks 1101, 1102 and 1103 which form the blockchain 1100 establish a particular embodiment of a sequence of values.

However, it should be noted that the input blocks generated by the consensus component do not need to be chained together according to embodiments. Rather any consensus protocol that reaches some kind of consensus between the nodes of a subnet on the processing order of received messages may be used according to embodiments.

Figure 12:
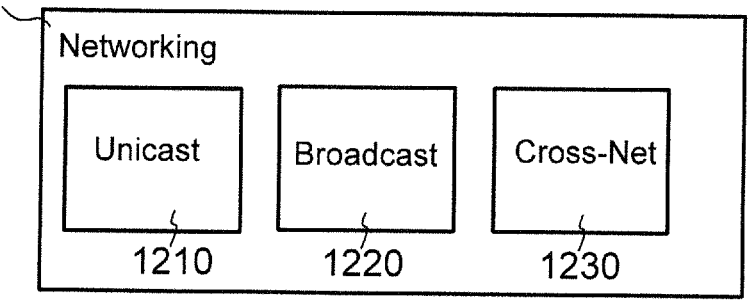
FIG. 12 shows a more detailed view of a networking component.

FIG. 12 shows a more detailed view of a networking component 1200, which is configured to run a networking protocol. The networking component 1200 may be e.g. a more detailed embodiment of the networking component 64 shown in FIG. 6. The networking component 1200 comprises a unicast component 1210 configured to perform a node-to-node communication, a broadcast component 1220 configured to perform an intra-subnet communication and a cross-net component 1230 configured to perform an inter-subnet communication.

Figure 13:
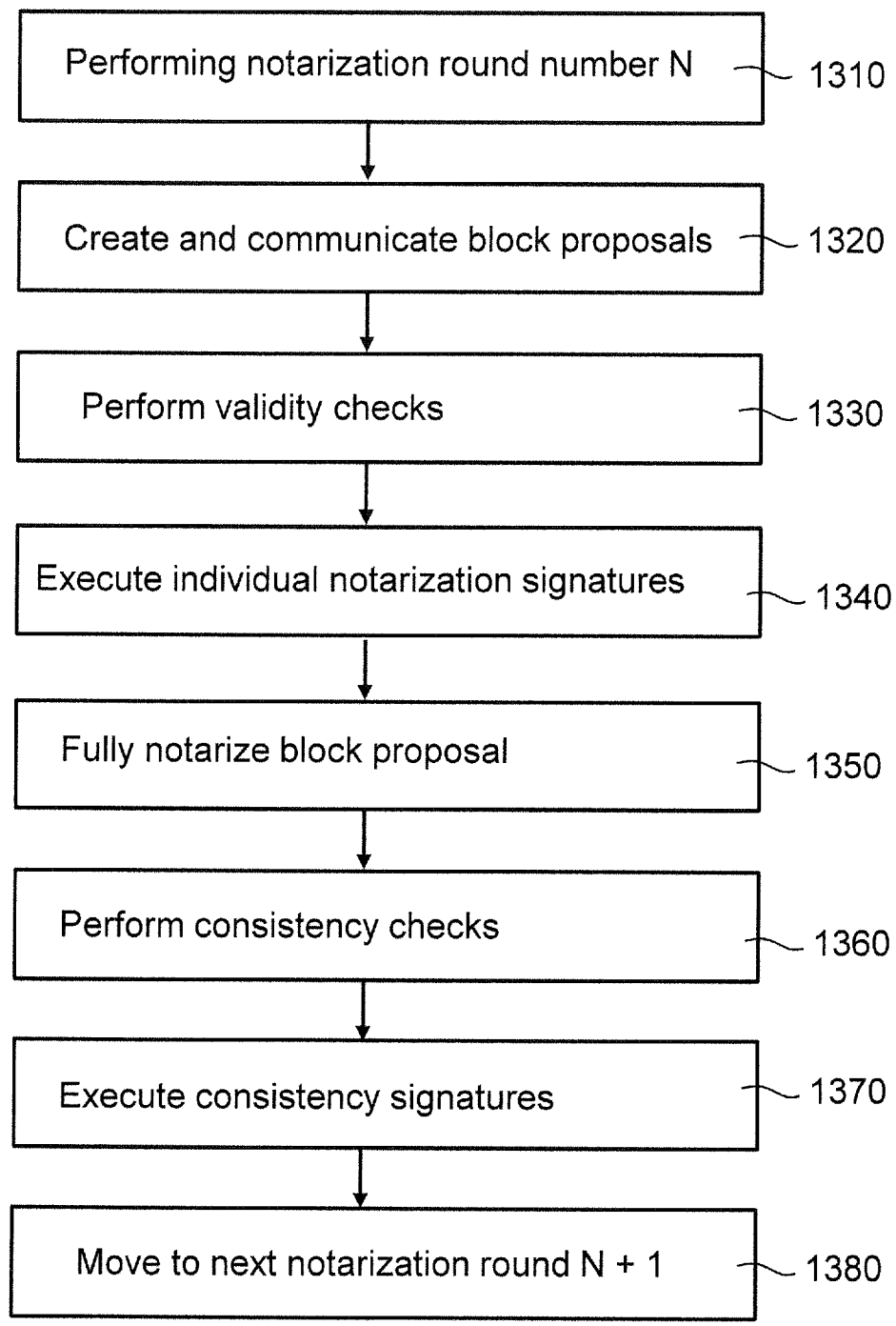
FIG. 13 shows a flow chart of method steps of a computer-implemented method according to embodiments of the invention.
Figure 14:
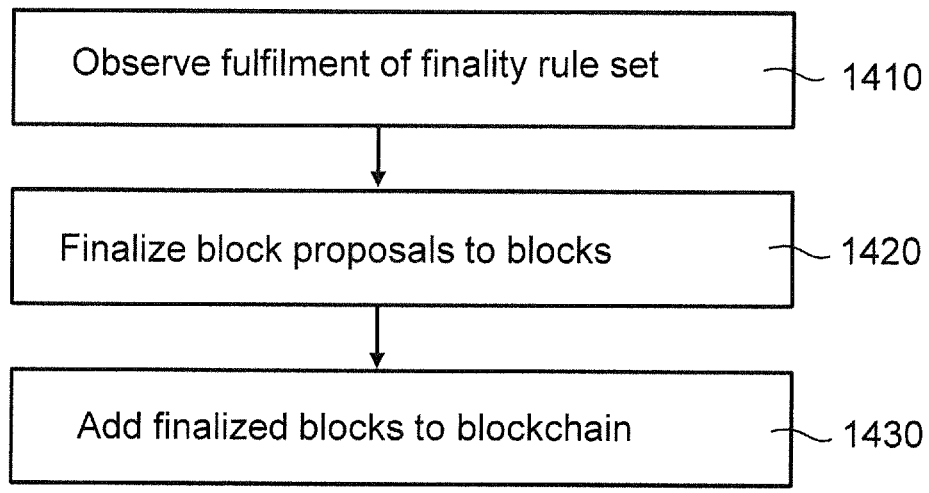
FIG. 14 shows a flow chart of method steps of a computer-implemented method according to embodiments of the invention.

FIG. 13 and FIG. 14 show a flow chart of method steps of a computer-implemented method for reaching a consensus on a sequence of values. According to this exemplary embodiment it is assumed that the sequence of values is embodied as a blockchain or in other words as a sequence of blocks of a blockchain.

More particularly, FIG. 13 illustrates the methods steps of notarization rounds of the method, while FIG. 14 illustrates the steps of a finality procedure comprising finalization rounds.

The computer-implemented method may be performed e.g. by the distributed networks 100 or 300 as described above.

The steps of the notarization rounds and the steps of the finality procedure can be performed in an asynchronous manner.

Referring now to FIG. 13, at a step 1310, the method starts with a first notarization round, e.g. with the notarization round with number N.

Then, at a step 1320, one or more network nodes of the network create block proposals to be added or written to a blockchain, e.g. a blockchain as described with reference to FIG. 11.

The block proposals are then communicated within the network, in particular communicated to a subset of the plurality of nodes which in the following will be denoted as notarization subset. The communication may be in particular performed by broadcasting, in particular by a gossip-protocol.

At a step 1330, the nodes of the notarization subset each perform a validity check of block proposals which they have received as result of the communication. The validity check comprises in particular a check whether the received block proposals comply with a predefined validity rule set. The validity rule set may be specified as part of the specification of the distributed network.

According to some embodiments, the validity check may perform a verification of block headers of the received block proposals, e.g. if a respective block proposal comes from a known node. Such a verification may also be denoted as shallow verification.

According to other embodiments, the validity check may perform a verification of the payload of block proposals, i.e. whether the payload complies with predefined criteria. This may also be denoted as deep verification.

According to some embodiments, the validity check (shallow or deep) for a given block proposal may depend on a block proposal from a previous notarization round to which the given block proposal refers/links back. For example, the validity check may check whether all previous block proposals to which the given block proposals refers back are notarized.

The step 1330 may be in particular performed during a time-out period.

The step 1330 may be in particular performed only after a time-out period.

Then, at a step 1340, the nodes of the notarization subset execute individual notarization signatures on a subset of the block proposals which are valid according to the validity check. Such an individual notarization signature is a signature by a single node which confirms that the block proposal has passed the validity check performed by the node. Hence the individual notarization signature may also be denoted as individual validity signature. As a result, an individually-notary-signed block proposal has been created.

The distributed network, in particular the nodes of the notarization subset, observe whether a predefined number of individual notarization signatures has been executed for one of the block proposals. In particular, the individual notarization signatures may be broadcasted to the nodes of the notarization subset, e.g. by a gossip protocol. This may be done e.g. by the P2P layer as shown in FIG. 10.

If this is the case, the distributed network fully notarizes, at a step 1350, the corresponding block proposal. This creates a fully notarized block proposal for the respective notarization round. The predefined number may be chosen according to the security needs of the application. According to some embodiments, the number may correspond to more than two thirds (⅔) of the nodes of the notarization subset.

Once one of the block proposals of a notarization round has been notarized, the nodes of the notarization subset stop to cast notarization signatures and continue, at a step 1360, with a consistency check of the block proposals of one or more notarization rounds.

As part of the consistency check, a node of the notarization subset checks whether the block proposals of one or more notarization rounds are consistent with its own individual notarization signatures it has executed in the current notarization round. The consistency check may comprise in particular a check whether the block proposals comply with a predefined consistency rule set. The consistency rule set may define in particular scenarios which are not considered to be consistent. In this respect, a block proposal may be considered to be consistent according to the consistency rule set if a node of the notarization subset has, in the current notarization round, not executed any consistency signature which is in conflict with the block proposal. A conflict may encompass in particular ambiguities.

Such ambiguities may be "subjective" according to embodiments of the invention, i.e. the consistency rule set may be applied by each node individually based on the executed individual notarization signatures of this and only this node.

Such ambiguities may be round-dependent according to embodiments of the invention, i.e. the consistency rule set may be applied based on the executed individual notarization signatures that a given node has executed in one and only one particular notarization round.

As an example, if a respective node has notary-signed individually more than one block proposal in the current notarization round, this creates an ambiguity.

On the other hand, a value proposal of a current notarization round may be considered to be consistent according to the consistency rule set if a respective node of the notarization subset has executed in the current notarization round at most one individual notarization signature for any block proposal and this individual notarization signature was for the block proposal.

According to another embodiment, a block proposal of a previous notarization round may be considered to be consistent according to the consistency rule set if all block proposals for which a respective node of the notarization subset has executed an individual notarization signature in the current notarization round refer back to the block proposal of the previous notarization round.

"Referring back" may mean by virtue of a direct or indirect link established via the inclusion of a hash digest of a block proposal from a previous notarization round into a block proposal from a later notarization round.

According to an embodiment, the consistency rule set may define that a block proposal under consistency check is consistent from the perspective of a node of the notarization subset if all block proposals of the current notarization round for which the node has executed an individual notarization signature link back to the block proposal under consistency check, where the link back can be in one step (directly) or in multiple steps (indirectly).

Then, at a step 1370, the nodes of the notarization subset perform a consistency signature on a subset of the block proposals which are consistent according to the consistency rule set. This creates consistency-signed block proposals. The consistency-signed block proposals comprise according to embodiments the notarization round number to be finalized, the current notarization round number and the signing node. Accordingly, the consistency signatures are only valid for the specific combination of the current notarization round and the notarization round that shall be finalized.

Subsequently, the plurality of nodes move, at a step 1380, to the next notarization round, e.g. the round N+1, and the above described methods steps 1320 to 1370 are repeated.

According to embodiments the move to the next notarization round may be in particular triggered once a fully notarized block proposal has been observed for the current notarization round N. In particular, the next notarization round N+1 may start in parallel to the current consistency signature period of the current notarization round N. In particular, nodes that are outside the notarization subset in the current notarization round N move to the next notarization round N+1 once a fully notarized block proposal has been observed for the current notarization round N.

FIG. 14 shows the steps of a finality procedure according to embodiments of the invention.

The finality procedure aims to finalize the notarization rounds. Accordingly, each notarization round involves a corresponding finality procedure. For this, at a step 1410, the distributed network, in particular the nodes of the notarization subset, observe whether a finality rule set has been fulfilled. According to this embodiment it is assumed that the finality rule set is fulfilled for a value proposal once a predefined number of consistency signatures has been observed for the value proposal. Accordingly, at the step 1410, the distributed network, in particular the nodes of the notarization subset, observe the number of individual consistency signatures which block proposals of a notarization round that shall be finalized have received. In particular, this step may involve to broadcast the individual consistency signatures to the nodes of the notarization subset, e.g. by a gossip protocol.

Again, the required number may depend on the security needs of the application. According to embodiments, it may be specified that the consistency signatures of more than ⅔ of the nodes of the notarization subset are required.

The required number may be predefined as system parameter of the distributed network. If the predefined number has been observed by the distributed network for one of the block proposals, the distributed network finalizes, at a step 1420, the block proposal and creates a finalized block proposal.

Then, at a step 1430, the finalized block proposal may be added to the blockchain.

According to another embodiment the finality rule set may be only fulfilled for a value proposal once a predefined number of consistency signatures has been observed for the value proposal and once the value proposal has been fully notarized. Hence according to such an embodiment both criteria are observed at step 1410.

According to embodiments, the network or the nodes of the notarization subset may in addition consider an implied chain of blocks which is implied by a finalized block for addition to the blockchain. As an example, if the notarization subset has initially finalized only a block B1. And if then the notarization subset observes sufficiently many consistency signatures on another block proposal B3 and accordingly finalizes block B3, and if block B3 implies the implied chain of blocks B1←B2←B3, then the notarization subset may consider the implied chain of blocks B1←B2←B3 as the finalized blockchain and hence also finalize the block proposal B2.

The individual notarization signatures and the consistency signatures which are executed in the steps 1340 and 1370 respectively may utilize a threshold signature scheme, a multi-signature scheme or an aggregate signature scheme.

According to some embodiments, a finality signature of the last finalized block proposal may be added to the plurality of block proposals of the current notarization round. Such a finality signature could e.g. comprise an aggregate signature comprising the individual consistency signatures of the predefined number of nodes.

A finality signature may simplify re-validation of finalized blocks by outside observers. For example, an aggregated signature will be smaller than a set of individual signatures, thereby forcing the outside observer to download less data. For example, a single aggregated signature will be faster to verify than multiple individual signatures. For example, a threshold signature will force the outside observer to hold less public key material to be able to do the validation.

A finality signature may simplify the broadcast protocol. For example, according to the broadcast protocol, if a node in the distributed network has finalized a block proposal from notarization round r and has a finality signature in hand then the node can stop relaying individual consistency signatures for any block proposal from the same notarization round r and for any block proposal from a notarization round prior to r. The node can instead only relay the finality signature. The advantage of such an embodiment is that it allows to put an upper bound on the number of artifacts that need to be relayed per round.

The size and the selection of the notarization subset may depend on the needs of the respective application. The size of the notarization subsets influences on the one hand the speed and on the other hand the security of the consensus mechanism.

According to some embodiments, the network may use the same notarization subset for a predefined time period, e.g. for a predefined number of hours, days, weeks or month.

According to some embodiments, the network may use the same notarization subset for a predefined range of notarization rounds or a predefined range of block numbers.

According to some embodiments, the network may require the nodes of the notarization subset to have made a predefined minimum stake deposit.

According to some embodiments, the network may select the nodes of the notarization subset in dependence on the stake of the nodes. E.g., the higher the stake, the higher the chance to be selected for the notarization subset.

According to further embodiments, the network may regularly change the nodes of the notarization subset, e.g. every hour or every day.

According to further embodiments, the network may regularly change the nodes of the notarization subset, e.g. every N number of notarization rounds or blocks.

According to further embodiments, the network may select the nodes of the notarization subset in dependence on a randomness beacon.

Figure 15:
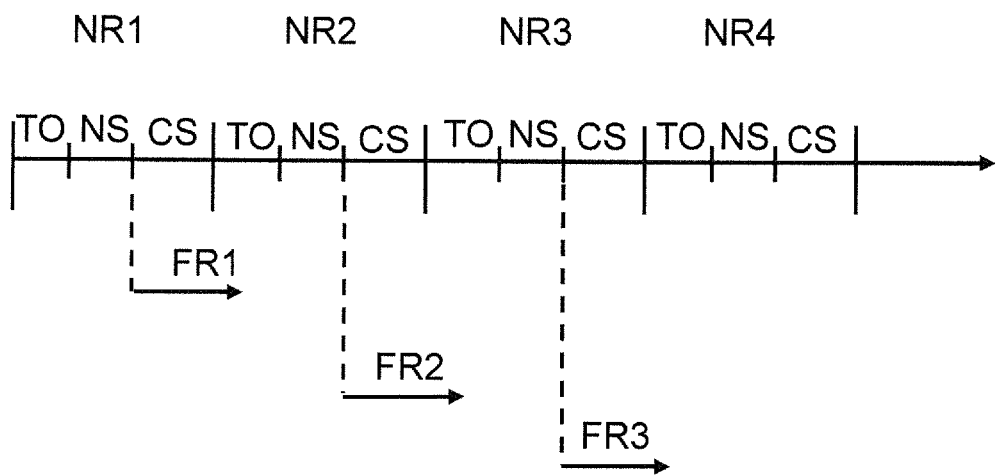
FIG. 15 illustrates an exemplary timing diagram of periods of notarization rounds and finalization rounds according to an embodiment of the invention.

FIG. 15 illustrates an exemplary timing diagram of periods of the notarization rounds and the finalization rounds according to an embodiment of the invention.

The underlying method performs consecutively notarization rounds NR1, NR2, NR3 and NR4. Each of the notarization rounds NR1, NR2, NR3 and NR4 comprises three phases. At first, a time-out period TO is provided. During the time-out period TO, the notarization subset of the plurality of nodes may already perform a validity check of the block proposals of the respective notarization round. More particularly, it may disregard invalid block proposals and compile a list of valid block proposals. However, the notarization subset of the plurality of nodes is configured to wait with the execution of the notarization signatures until the timeout period has expired.

According to some embodiments, the length or duration of the timeout period TO may be dynamically adjusted.

After the timeout period TO, it follows a notarization signature period NS. During the notarization signature period NS, the notarization subset of the plurality of nodes may execute individual notarization signatures on block proposals which are valid according to a predefined validity rule set.

According to some embodiments, the notarization subset may execute notarization signatures on all block proposals which it considers to be valid, while according to other embodiments the notarization subset may execute a single notarization signature only on the valid block proposal with the highest rank of the list.

The distributed network, more particularly the nodes of the notarization subset, observe whether one of the block proposals of the current notarization round has received sufficiently many individual notarization signatures. As soon as this is the case, the nodes of the notarization subset stop to cast notarization signatures and proceed with a consistency signature period CS.

At the following consistency signature period CS, the notarization subset of the plurality of nodes performs a consistency check as described above and executes consistency signatures on a subset of the block proposals which are consistent according to the consistency rule set. Once the respective node has executed its individual consistency signatures, it moves to the next notarization round NR2 which again has in the beginning a timeout period TO. It should be noted that the consistency signature period only takes as long as it takes for the respective node to cast its consistency signatures. Hence the length of the consistency signature period may vary from node to node and may also be different between consecutive consistency signature periods of the same node.

According to this exemplary embodiment, the start of the consistency signature period CS triggers a finality procedure comprising a finalization round FR1 for the block proposals of the corresponding notarization round NR1. According to other embodiments, the finality procedure may start with a predefined delay after the beginning of the consistency signature period CS.

During the finalization round FR1, the distributed network, more particularly the nodes of the notarization subset, observe the number of consistency-signatures of the block proposals of the notarization round NR1. Once a predefined number of consistency signatures has been observed for one of the block proposals of the notarization round NR1, the corresponding block proposal will be finalized and added to the blockchain and the finalization round FR1 will end.

According to some embodiments, the corresponding block proposal will be finalized and added to the blockchain only if it is also fully notarized.

Similarly, finalization rounds FR2 and FR3 are started after the beginning of the consistency signature periods CS of the notarization rounds NR2 and NR3 respectively.

The duration of the finalization rounds FR1, FR2 and FR3 depends on the time it takes to collect the predefined number of consistency signatures for a block proposal of the corresponding notarization rounds NR1, NR2 and NR3 respectively. Hence the finalization rounds FR1, FR2 and FR3 may have different durations.

A finalization round may end also when a later finalization round ends. For example, FR2 may end because the predefined number of consistency signatures has been observed for FR2. This may cause FR1 to end by implication, even if the predefined number of consistency signatures has not yet been observed for FR1.

For the example of FIG. 15 it is assumed that the consistency signatures which are executed in a consistency signature period of a notarization round $NR_X$ are casted on block proposals created in the same notarization round $NR_X$.

According to other embodiments, the consistency signatures which are executed in a consistency signature period CS of a notarization round $NR_X$ may be casted on block proposals created in a previous notarization round $NR_{X-d}$, wherein d may be an integer and system parameter. The value d may according to embodiments be variable. According to embodiments, multiple values of d may be considered at the same time. According to embodiments, a range of values of d may be considered at the same time.

An example is illustrated in FIG. 16, which shows an exemplary timing diagram of phases in the notarization rounds and the finalization rounds according to another embodiment of the invention.

As in FIG. 15, the underlying method of FIG. 16 performs consecutively notarization rounds NR1, NR2, NR3 and NR4. Each of the notarization rounds NR1, NR2, NR3 and NR4 comprises a timeout period TO, a notarization signature period NS and a consistency signature period CS as generally described with reference to FIG. 15.

According to the embodiment shown in FIG. 16 it is assumed that the consistency signatures which are executed in a consistency signature period of a notarization round $NR_X$ are casted on block proposals created in the last notarization round $NR_{X-1}$. As an example, the consistency signatures which are executed in the consistency signature period NR2 are casted on block proposals created in the last notarization round $NR_1$. Accordingly, also the finalization round for the respective notarization rounds may start with a delay. More particularly, as shown in FIG. 16, the finalization round FR2 may start only after the beginning of the consistency signature period CS of the notarization round NR3.

According to yet other embodiments, the consistency check may be performed for multiple rounds to be finalized as will be illustrated further below.

According to embodiments, the notarization rounds may also be denoted as first rounds and the finalization rounds as second rounds.

Figure 17:
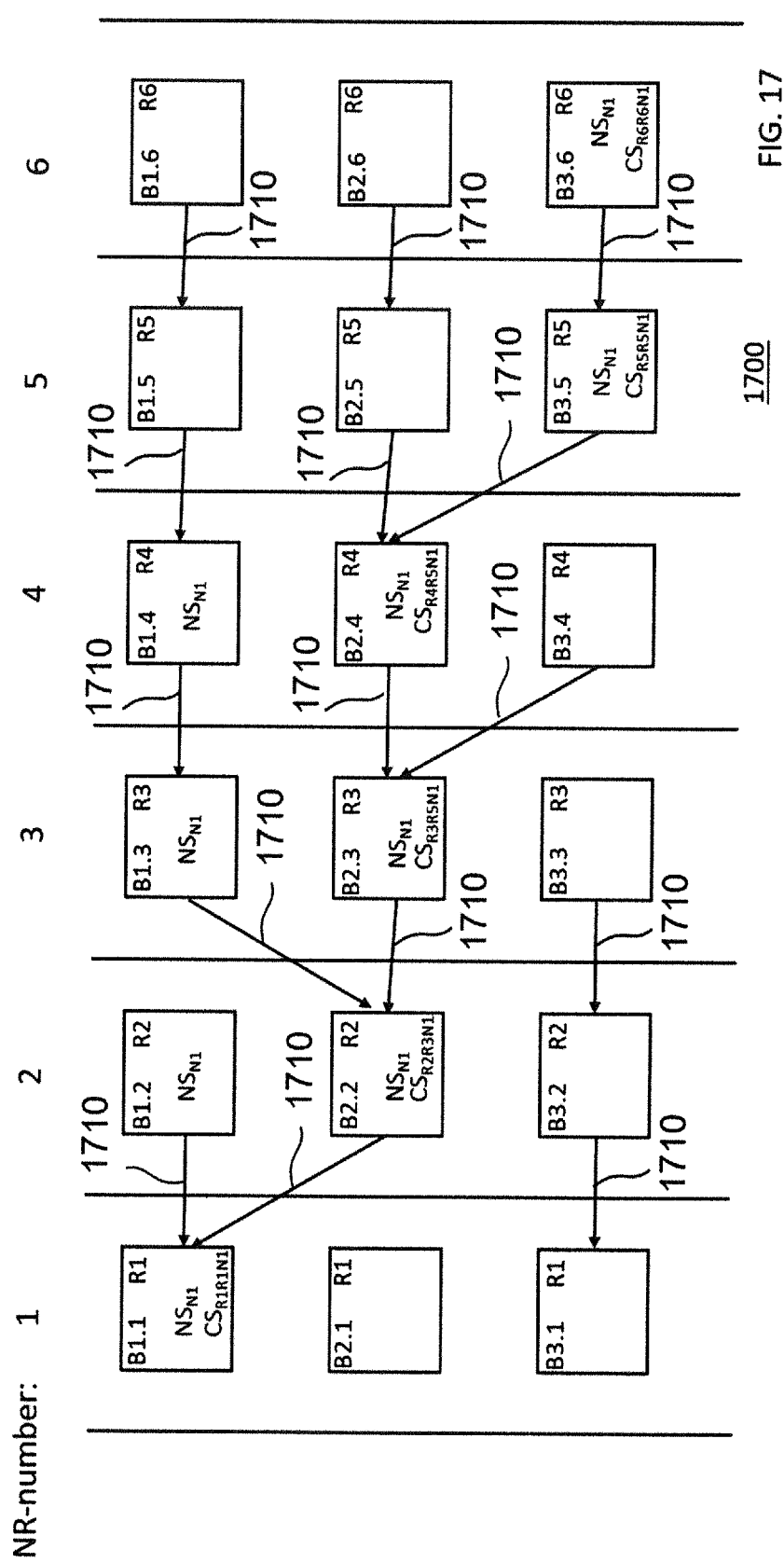
FIG. 17 illustrates an exemplary flow chart/timing diagram of 6 consecutive notarization rounds.

FIG. 17 illustrates an exemplary flow chart/timing diagram of 6 consecutive notarization rounds NR1, NR2, NR3, NR4, NR5 and NR6 according to an embodiment of the invention. More particularly, it illustrates method steps which are performed by a node N1 which is assumed to be a node of the notarization subset of the nodes.

According to this example it is assumed that during each of the notarization rounds NR1-NR6, 3 block proposals are created. The block proposals carry the respective round number of the corresponding notarization round, e.g. R1 for the first notarization round NR1. The block proposals also comprises a block number B.X.Y, wherein X denotes a consecutive number of the block proposal of a notarization round and Y the round number of the notarization round.

The block proposals comprise links 1710 which are indicated by arrows to a respective parent block proposal of a previous notarization round.

Referring now to the first notarization round R1, there are 3 block proposals B1.1, B2.1 and B3.1. The links of the block proposals of the first notarization round are not shown.

The node N1 performs a validity check for the three block proposals. In this example it is assumed that it has found only the block proposal B1.1 as valid and accordingly it executes an individual notarization signature $NS_{N1}$ on the block proposal B1.1, wherein the subscript N1 denotes the signing node.

After the execution of the individual notarization signature $NS_{N1}$, the node N1 performs a consistency check. The consistency check encompasses a check whether a block proposal for which the node N1 has executed in the current round R1 an individual notarization signature which is considered to be consistent according to a consistency rule set. As in this round R1 the node N1 has only executed one single individual notarization signature on the block proposal B1.1, the block B1.1 is considered to be consistent and hence the node N1 executes a consistency signature $CS_{R1R1N1}$ on the block proposal B1.1

The consistency signature comprises the notarization round number to be finalized, the current notarization round number and the signer or signing node. Accordingly, the subscript "R1R1N1" denotes with the first "R1" the notarization round number to be finalized, with the second "R1" the current notarization round number and with "N1" the signing node.

Referring now to the second notarization round R2, there are again 3 block proposals B1.2, B2.2 and B3.2.

The node N1 performs again a validity check for the three nodes. In this example it is assumed that it has found the block proposals B1.2 and B2.2 as valid and accordingly it executes an individual notarization signature $NS_{N1}$ on the block proposals B1.2 and B2.2.

After the execution of the individual notarization signatures $NS_{N1}$, the node N1 performs the consistency check. As in this round R2 the node N1 has executed two individual notarization signatures on two different blocks, the corresponding block proposals B1.2 and B2.2 are not considered to be consistent and hence the node N1 executes no consistency signature in the notarization round R2.

Referring now to the third notarization round R3, there are again 3 block proposals B1.3, B2.3 and B3.3.

The node N1 performs again a validity check for the three block proposals. In this example it is assumed that it has found the block proposals B1.3 and B2.3 as valid and accordingly it executes an individual notarization signature $NS_{N1}$ on the block proposals B1.3 and B2.3.

After the execution of the individual notarization signatures $NS_{N1}$, the node N1 performs the consistency check. As in this round R3 the node N1 has executed two individual notarization signatures on two different blocks, the corresponding block proposals B1.3 and B2.3 are not considered to be consistent. However, as both block proposals B1.3 and B2.3 refer back or link to the same parent block proposal B2.2 of the previous notarization round R2, the consistency check considers the block proposal B2.2 of the previous round R2 as consistent and executes a consistency signature $CS_{R2R3N1}$ on the block proposal B2.2. The subscript "R2R3N1" denotes with the first "R2" the notarization round number to be finalized, in this example the previous notarization round R2 and with "R3" the current notarization round number R3.

Referring now to the fourth notarization round R4, there are again 3 block proposals B1.4, B2.4 and B3.4.

The node N1 performs again a validity check for the three nodes. In this example it is assumed that it has found the block proposals B1.4 and B2.4 as valid and accordingly it executes an individual notarization signature $NS_{N1}$ on the block proposals B1.4 and B2.4.

After the execution of the individual notarization signatures $NS_{N1}$, the node N1 performs the consistency check. As in this round R4 the node N1 has executed two individual notarization signatures on two different blocks, the corresponding block proposals B1.4 and B2.4 are not considered to be consistent.

Referring now to the fifth notarization round R5, there are again 3 block proposals B1.5, B2.5 and B3.5.

The node N1 performs again a validity check for the three nodes. In this example it is assumed that it has found only the block proposals B3.5 as valid and accordingly it executes an individual notarization signature $NS_{N1}$ only on the block proposal B3.5.

After the execution of the individual notarization signatures $NS_{N1}$, the node N1 performs the consistency check. As in this round R3 the node N1 has executed only one individual notarization signature on the block proposal B3.5, the consistency check considers the block proposal B3.5 of the current round R5 as valid and executes a consistency signature $CS_{R5R5N1}$ on the block proposal B3.5.

Furthermore, it also performs a consistency check for the previous rounds R3 and R4 and considers the blocks B2.4 and B2.3 as consistent as the block B3.5 links or refers back to block B2.4. Accordingly, it executes a consistency signature $CS_{R4R5N1}$ on the block proposal B2.4 and a consistency signature $CS_{R3R5N1}$ on the block proposal B2.3.

Referring now to the sixth notarization round R6, there are again 3 block proposals B1.6, B2.6 and B3.6.

The node N1 performs again a validity check for the three nodes. In this example it is assumed that it has found only the block proposals B3.6 as valid and accordingly it executes an individual notarization signature $NS_{N1}$ only on the block proposal B3.6.

After the execution of the individual notarization signatures $NS_{N1}$, the node N1 performs the consistency check. As in this round R6 the node N1 has executed only one individual notarization signature on the block proposal B3.6, the consistency check considers the block proposal B3.6 of the current round R6 as valid and executes a consistency signature $CS_{R6R6N1}$ on the block proposal B3.6.

In the above presented example it is assumed that the step of performing the consistency check is performed for multiple notarization rounds to be finalized. As an example, in the notarization round NR 5 the node N1 casts signatures for the notarization rounds NR3, NR4 and NR5.

According to other embodiments, as described e.g. with reference to FIGS. 15 and 16, the nodes may perform the consistency check only for a single notarization round to be finalized.

According to embodiments, the nodes may perform, in the consistency signature period of a single notarization round r, a consistency check for block proposals from multiple notarization rounds h as described in FIG. 17, but only for a subset of round numbers h instead of all possible values for h.

In some embodiments, the subset of round numbers h may be pre-selected. For example, a node may consider for consistency check only every n-th round where n is a pre-defined integer, i.e. only those values for h are considered that satisfy h=0 mod n. This is done to reduce the overhead of the protocol and to reduce the number of messages to be broadcasted.

In other embodiments, the subset of round numbers h may be a pre-defined function of r. For example, the subset of round numbers h may be the interval [r−d,r] where d is a pre-defined constant. This is done to put an upper bound on the overhead of the protocol and to put an upper bound on the number of messages to be broadcasted.

In other embodiments, the subset of round numbers h may be the interval (s,s+d] where s is the last round for which the respective node has observed a finalized block and d is a pre-defined constant. This again is done to create upper bounds on overhead and message volume.

In the following section we disclose further cryptographic details according to embodiments of the invention.

According to embodiments of the invention, the distributed network may be designed for a desired security assumption or security need.

According to embodiments, assumptions as follows may be made:

Every notarization subset has the size n, wherein n is an integer. In other words, a notarization subset comprises a number n of nodes.

In every notarization subset at most f nodes are Byzantine (dishonest), while the rest follows the protocol (honest), wherein f is an integer.

The predefined number of individual notarization signatures which are required to notarize a value proposal and to create a fully notarized value proposal is t1, wherein t1 is an integer.

The predefined number of individual consistency signatures required to fulfill the finality rule set and to finalize a value proposal is t2, wherein t2 is an integer.

t1, t2, n and f are chosen such that an equation as follows applies:

$$t1+t2>n+f$$

The consistency rule set specifies that a value proposal A is consistent (from the perspective of a node in a current round) if and only if A is a common ancestor of all current value proposals for which the node executed an individual notarization signature in the current round. More particularly, A is a common ancestor if it is directly or indirectly linked to all current value proposals for which the node executed an individual notarization signature in the current round.

If the node did not execute any individual notarization signatures in the current round then all A are consistent.

The finality rule set specifies that at least t2 consistency signatures are required, all created during one and the same notarization round r by the notarization subset of that round r.

Based on the above assumptions, a theorem as follows may be made according to an embodiment: Suppose a value proposal A from round h is finalized. Then any sequence of notarized value proposals that is sufficiently long contains A. More precisely: There is a number $r=r(A)$ such that any sequence of notarized value proposals of length r contains A.

According to an embodiment, a proof for the theorem may be provided as follows.

Since A is finalized, there is a number $r>=h$ such that A has received at least t2 consistency signatures that were all created during the consistency period CP of round r.

Let B be a fully notarized value proposal from round r. We claim: A is an ancestor of B. This proves the Theorem.

Assume the claim is false, i.e. A is not an ancestor of B. Let S be the notarization subset that was active in round r. At least t2 nodes in S executed an individual consistency signature for A. Out of those t2 nodes at least t2-f were honest. According to the consistency rule set, those t2-f nodes did not execute an individual notarization signature on B. For, if a node in S executed an individual notarization signature on B in round r then A would not be consistent for that node in round r because A is not an ancestor of B. Hence, the number of individual notarization signatures on B by nodes from S is at most $n-(t2-f)=n+f-t2<t1$. This means B is not fully notarized. Since this is a contradiction, the above claim is true.

Some examples are presented below. Assuming $f<n/3$, the distributed network may choose e.g. t1, t2 and n according to embodiments as follows:

$$t1=t2=\tfrac{2}{3}*n, \text{ or}$$

$$t1=\tfrac{5}{6}*n, t2=\tfrac{1}{2}*n, \text{ or}$$

$$t2=\tfrac{1}{2}*n, t1=\tfrac{5}{6}*n.$$

It should be noted that for the above embodied proof the finality rule set requires t2 consistency signatures that were all created during the same notarization round, even if the notarization subset does not change from round to round.

Figure 18:
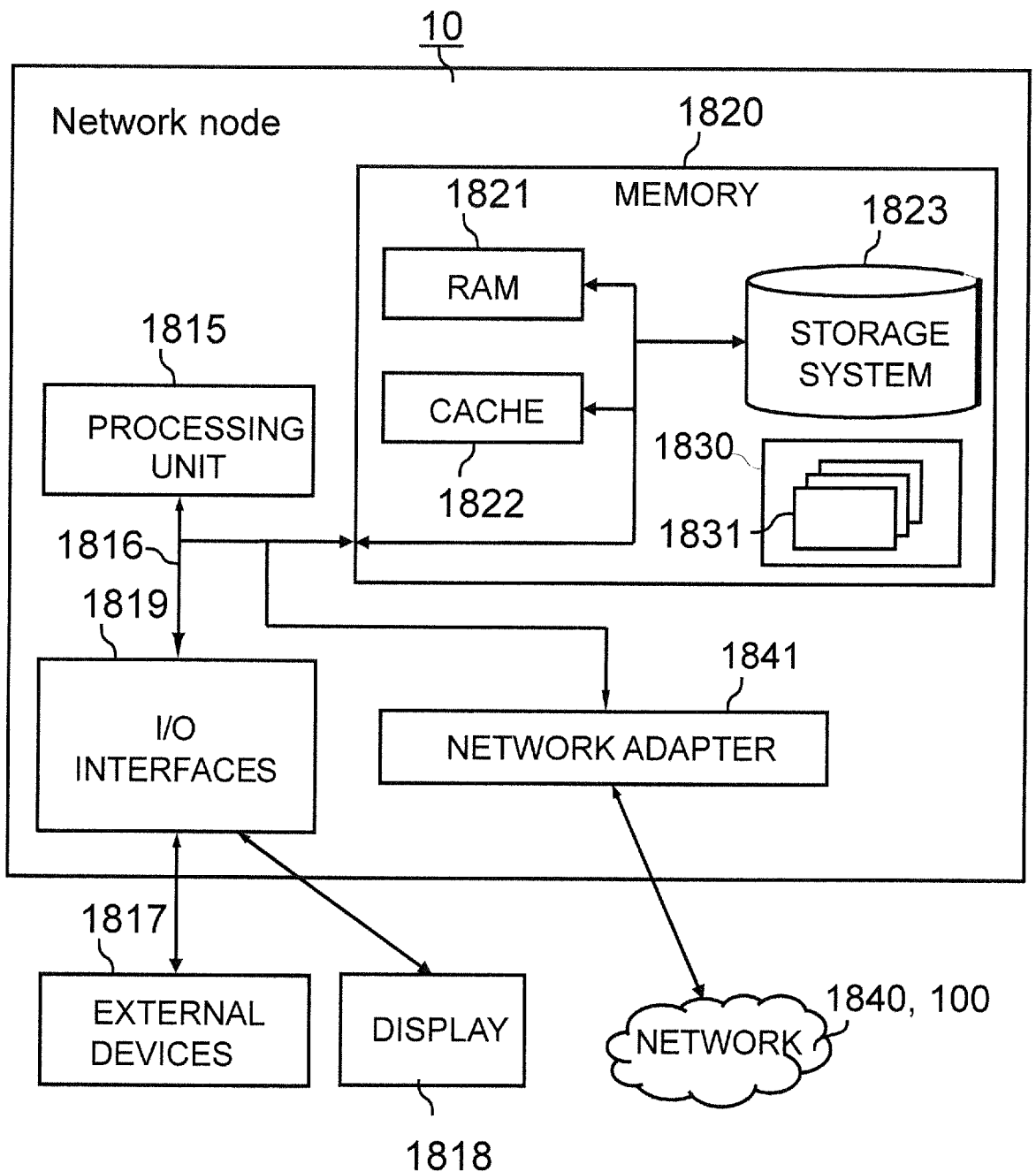
FIG. 18 shows an exemplary embodiment of a node according to an embodiment of the invention.

Referring now to FIG. 18, a more detailed block diagram of a network node 10 according to embodiments of the invention is shown, e.g. of the network 100 of FIG. 1. The network node 10 establishes a computing node that may perform computing functions and may hence be generally embodied as computing system or computer. The network node 10 may be e.g. a server computer. The network node 10 may be operational with numerous other general purpose or special purpose computing system environments or configurations.

The network node 10 may be described in the general context of computer system-executable instructions, such as program modules, being executed by a computer system. Generally, program modules may include routines, programs, objects, components, logic, data structures, and so on that perform particular tasks or implement particular abstract data types. The network node is shown in the form of a general-purpose computing device. The components of network node 10 may include, but are not limited to, one or more processors or processing units 1815, a system memory 1820, and a bus 1816 that couples various system components including system memory 1820 to processor 1815.

Bus 1816 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Network node 10 typically includes a variety of computer system readable media. Such media may be any available media that is accessible by network node 10, and it includes both volatile and non-volatile media, removable and non-removable media.

System memory 1820 can include computer system readable media in the form of volatile memory, such as random access memory (RAM) 1821 and/or cache memory 1822. Network node 1810 may further include other removable/non-removable, volatile/non-volatile computer system storage media. By way of example only, storage system 1823 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1816 by one or more data media interfaces. As will be further depicted and described below, memory 1820 may include at least one computer program product having a set (e.g., at least one) of program modules that are configured to carry out the functions of embodiments of the invention.

Program/utility 1830, having a set (at least one) of program modules 1831, may be stored in memory 1820 by way of example, and not limitation, as well as an operating system, one or more application programs, other program modules, and program data. Each of the operating system, one or more application programs, other program modules, and program data or some combination thereof, may include an implementation of a networking environment. Program modules 1831 generally carry out the functions and/or methodologies of embodiments of the invention as described herein. Program modules 1831 may carry out in particular one or more steps of a computer-implemented method for reaching a consensus on a sequence of values.

Network node 10 may also communicate with one or more external devices 1817 such as a keyboard or a pointing device as well as a display 1818. Such communication can occur via Input/Output (I/O) interfaces 1819. Still yet, network node 10 can communicate with one or more networks 40 such as a local area network (LAN), a general wide area network (WAN), and/or a public network (e.g., the Internet) via network adapter 1841. According to embodiments the network 1840 may be in particular a distributed network comprising a plurality of network nodes 10, e.g. the network 100 as shown in FIG. 1. As depicted, network adapter 1841 communicates with the other components of network node 10 via bus 1816. It should be understood that although not shown, other hardware and/or software components could be used in conjunction with network node 10.

The network node 10 provides network resources for the corresponding distributed network. The network resources include in particular the processing unit 1815 and the memory 1820 including the storage system 1823.

Figure 19A:
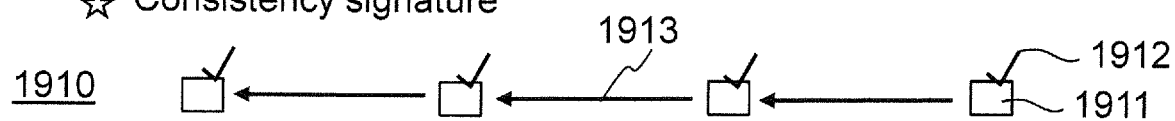
FIGS. 19*a* and 19*b* illustrate an asynchronous communication model and a corresponding asynchronous consensus mechanism.
Figure 19A:
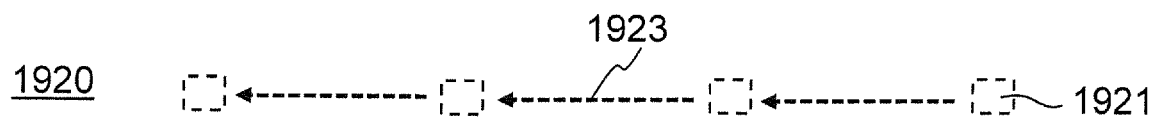
Figure 19B:
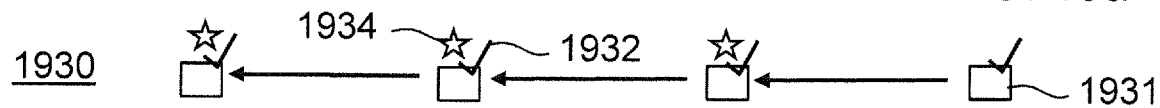
Figure 19B:

FIGS. 19a and 19b illustrate an asynchronous communication model and a corresponding asynchronous consensus mechanism of a distributed network according to an embodiment of the invention.

Synchronous consensus protocols rely on network synchrony to observe agreement. In other words, the assumption is made that all the messages have been received by the other nodes/replicas after a predefined time has elapsed. The messages may be blocks, for example, and agreement is determined by looking to the longest blockchain. With such synchronous consensus protocols there is a trade-off between security and low latency. If the predefined time is chosen long, a node can be quite sure that it has received all relevant messages and knows what is agreed upon, but with very high latency. If on the other hand the predefined time is rather short, the latency may be improved, but the node may not have received all blocks yet and may consider the wrong inputs agreed upon.

Embodiments of the invention address the technical problem associated with this trade-off by providing the finality procedure that can be performed in an asynchronous manner in parallel to the notarization rounds. The finality procedure provides nodes/replicas concrete evidence when consensus has been reached on new value proposals.

At every height, when a node stops executing individual notarization signatures because it sees a fully notarized block proposal b, it will look at how many individual notarization signatures it executed at this height. If it did not sign any other block proposal than b, it may place a consistency signature on b. According to such an embodiment the meaning of a consistency signature from node i on height h block b can be understood as: "I, node i, did not execute any individual notarization signature on any block proposal other than b at height h."

The nodes of the notarization subset broadcast their consistency signatures (if they create any), and a sufficient number (2f+1) of consistency signatures may fulfil the finality rule set such that the block proposal may be finalized. Once a node/replica sees a full finalization on a block proposal b, it considers b and the chain implied by b as final.

This finalization approach satisfies safety without making network assumptions, as long as at most f out of the n nodes/replicas are corrupt, with n=3f+1. That is, a finalization on height h block b means that a notarized block b'≠b at height h cannot exist.

Referring to FIG. 19a, the squares 1911 represent block proposals of a block proposal chain 1910. The ticks 1912 indicate that the block proposals 1911 have been fully notarized. The arrows 1913 point to the previous block proposal that each block proposal links to.

The block proposals 1921, illustrated with dashed lines, represent another possible chain 1920 of block proposals. As mentioned, embodiments of the invention are based on an asynchronous communication model. According to such an asynchronous communication model, even in the case that only the block proposal chain 1910 exists, the nodes of the network who see the chain 1910 cannot make any progress as they can never be certain that the dashed alternative chain 1920 does not exist. Hence, they cannot decide whether the block proposals 1911 have indeed agreed upon or not.

In order to facilitate the progress of the consensus in such an asynchronous consensus system/network embodiments of the invention use a consistency check and consistency signatures. Referring to FIG. 19b, the squares 1931 are fully notarized blocks and some of them carry in addition a consistency signature 1934, illustrated by a star. The consistency signatures 1934 rule out the existence of another dashed notarized block 1941 of a parallel chain of block proposals 1940 at the same block height. Hence, in this example, any node/replica that sees the consistency signatures 1934 can accept the respective block proposal as final. This holds even under the asynchronous communication assumption.

Figure 20:
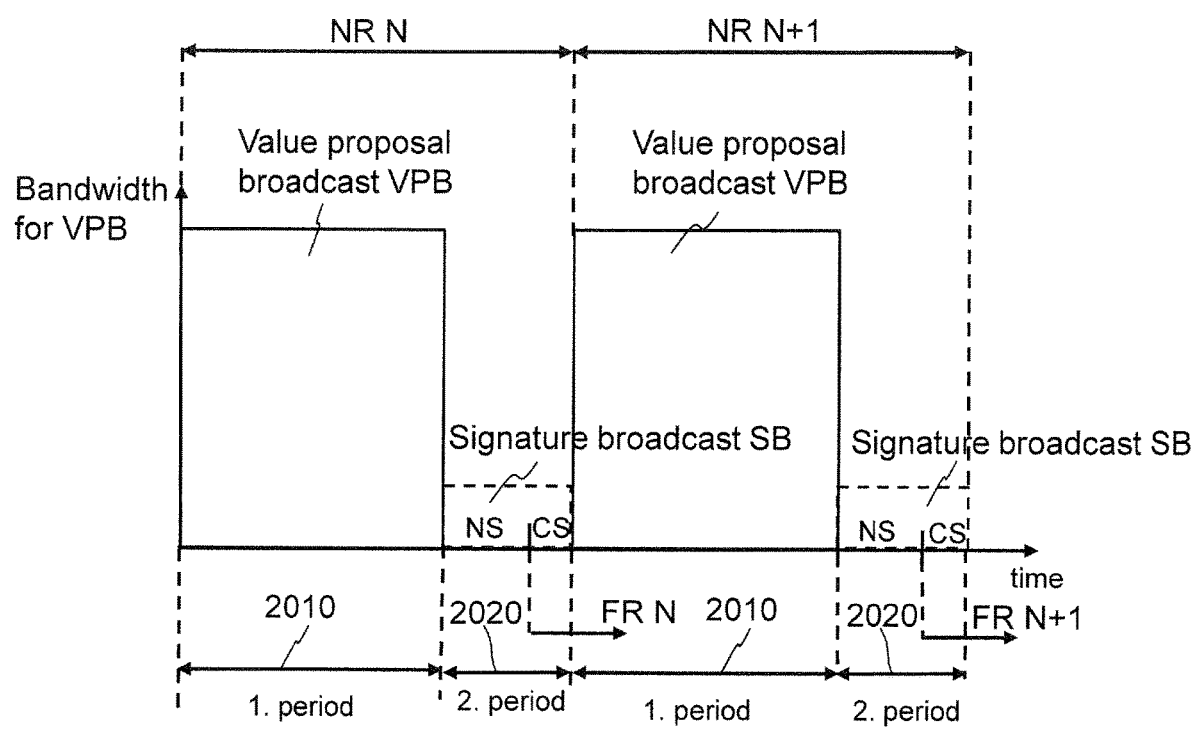
FIG. 20 illustrates a timing diagram of a communication scheme for the communication of value proposals according to embodiments of the invention.

FIG. 20 illustrates a timing diagram of a communication scheme for the communication of value proposals according to embodiments of the invention.

The horizontal axis denotes the time and the vertical axis the bandwidth which is utilized for the broadcasting of the value proposals.

According to the illustrated embodiment, the value proposals are communicated, in particular broadcasted, during first periods 2010 of the notarization rounds. The first periods 2010 may be denoted as VBP (Value Proposal Broadcast). The first periods VBP, 2010 may coincide according to embodiments with the time-out periods TO as illustrated in FIGS. 15 and 16.

Between the first periods VPB, 2010 there are arranged second periods 2020 which are used to execute and broadcast signatures of the protocol. The second periods may be denoted as SB (Signature Broadcast) and may be used in particular for the execution and broadcasting of the individual notarization signatures and of the consistency signatures. The second periods 2020, SB may coincide with the periods NS and CS as shown in FIGS. 15 and 16.

It should be noted that according to embodiments the second period SB, 2020 may only comprise the execution of the consistency signatures and the initial communication/broadcasting of the executed consistency signatures by the corresponding node, while the forwarding/further broadcasting of the consistency signatures by other nodes as well as the observation of the predefined minimum number of consistency signatures (as defined by the finality rule set) may be performed in the background as part of the finality procedure. Accordingly, the consistency signature period CS may be very short and is illustrated shorter than the notarization signature period NS.

Such a communication scheme addresses the technical problem of throughput increase, more particularly an increase of the consensus throughput. According to embodiments consensus throughput may be defined as the combined size of all value proposals that are finalized within a given unit of time.

According to embodiments high throughput may be achieved in particular with large value proposals which are broadcasted during the first periods VPB. The bottleneck according to such an embodiment is the network bandwidth required for broadcasting the (large) value proposals. With large value proposals the bandwidth required to broadcast the value proposals dominates over that required for other messages of the consensus mechanism which are mainly just signatures. According to embodiments such other messages may be denoted as the consensus overhead.

According to embodiments the value proposals which are broadcasted during the first periods have a size of at least 1 Mbyte, while the individual notarization signatures and the consistency signatures which are broadcasted during the second periods have a size of less than 200 Byte.

According to embodiments the first period VPB of the notarization rounds is at least as long as the second period SB of the notarization rounds NR, in particular at least twice as long as the second period.

This reduces the idle time which is not used for the broadcasting of value proposals and increases the consensus throughput. According to embodiments at least 60% of the time may be used for communicating/broadcasting the value proposals. In other words, the first periods VPB encompass at least 60% of the time and the second periods SB less than 40%.

Such a high bandwidth use for value proposal broadcast is in particular achieved by the innovative design of the consensus mechanism, in particular by executing and broadcasting the notarization signatures and by executing and initially communicating the consistency signatures during relatively short second periods between the first periods and in addition by forwarding/further broadcasting the consistency signatures and by performing the finality procedure in a staggered and overlapping manner in parallel to the notarization rounds.

Figure 21:
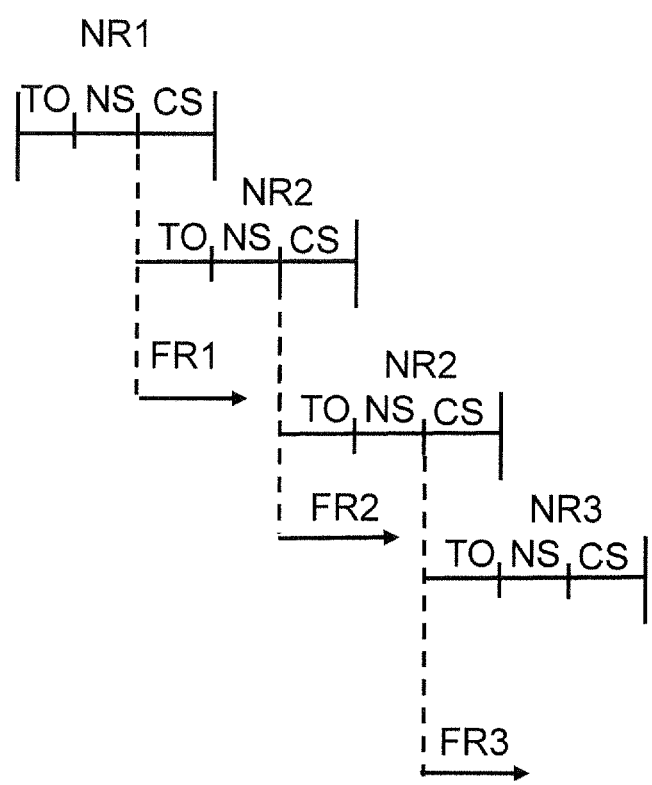
FIG. 21 illustrates an exemplary timing diagram of periods of notarization rounds and finalization rounds according to another embodiment of the invention.

FIG. 21 illustrates an exemplary timing diagram of periods of the notarization rounds and the finalization rounds according to another embodiment of the invention.

The underlying method performs consecutively notarization rounds NR1, NR2 and NR3, wherein each of the notarization rounds NR1, NR2 and NR3 comprises a time-out period TO, a notarization signature period NS and a consistency signature period CS. During the time-out period TO, new value proposals may be broadcasted and the notarization subset of the plurality of nodes may already perform a validity check of the value proposals. During the notarization signature period NS, the notarization subset of the plurality of nodes may execute and communicate/broadcast individual notarization signatures on block proposals which are valid according to a predefined validity rule set. Furthermore, the notarization signature period NS may comprise the receipt and forwarding of individual notarization signatures of other nodes as well as the notarizing. As soon as a sufficient number of individual notarization signatures has been observed, the nodes of the notarization subset may stop to cast notarization signatures and proceed with the consistency signature period CS of the respective notarization round. The consistency signature period CS may comprise in particular the consistency check as well as the execution and the initial communication of the consistency signatures by the nodes which have executed the consistency signatures.

According to this embodiment the network is configured to start a new notarization round already after the completion of the notarization signature period. As an example, the notarization round NR2 starts already right after the notarization signature period NS of the notarization round NR1. Concurrently, also the finality procedure FR1 may start. Hence according to such an embodiment the notarization periods may also overlap partly or in other words may be performed in a staggered manner.

Aspects of the present invention may be embodied as a system, in particular a distributed network, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

Aspects of the present invention are described herein with reference to flowchart illustrations and/or block diagrams of methods, networks, apparatus (systems), and computer program products according to embodiments of the invention.

Computer readable program instructions according to embodiments of the invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of networks, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

In the following section some additional and/or alternative embodiments and some additional and/or alternative wordings and definitions of terms of embodiments of the invention are provided.

According to embodiments the validity rule set may specify that a value proposal is valid if a node of the notarization subset has seen and/or received the value proposal. According to such an embodiment a full notarization may be considered as a confirmation or attestation or proof that a predefined number of nodes has seen and/or received the value proposal. According to such an embodiment, notarizing a value proposal may be regarded as a proof of publication. In this respect, the nodes of the notarization subset may serve according to embodiments as a witness that they have received and/or seen the corresponding value proposal.

According to further embodiments, the term notarization may also encompass voting. According to such an embodiment, the corresponding distributed network may aim to rate limit the value proposals and aim to notarize only one value proposal, in particular the one with the highest priority, or a group of value proposals with a high priority, per round.

According to some embodiments, the validity rule set may hence be embodied as a prioritization rule set. According to such an embodiment, the prioritization rule set may specify as validity rules priority rules. Such priority rules may specify criteria according to which a corresponding node may decide which value proposal or which value-proposals to notary-sign, i.e. to execute a notarization signature on.

According to embodiments, the validity check may encompass two different sub-steps, wherein the two-different sub-steps may be configured to check two different validity rule sets, e.g. a first validity rule set and a second validity rule set.

A first sub-step may encompass in particular a validity check of the first validity rule set, e.g. of one or more features of the value proposal as described above. A second sub-step may encompass in particular a validity check of the second validity rule set, which may specify e.g. that a value proposal is valid if a node of the notarization subset has seen and/or received the value proposal.

According to such an embodiment, the first sub-step and the second sub-step may be performed by different notarization subsets, e.g. by a first notarization subset and a second notarization subset. According to embodiments, the first notarization subset may be chosen smaller than the second notarization subset.

According to embodiments, a notarization signature may also be denoted as or may represent a vote, the notarization rounds may be denoted as pre-approval rounds and a notarized value proposal as a pre-approved value proposal.

According to embodiments, a notarization signature may also be denoted as validity signature.

While there are shown and described presently preferred embodiments of the invention, it is to be distinctly understood that the invention is not limited thereto but may be otherwise variously embodied and practiced within the scope of the following claims.

The invention claimed is:

1. A distributed network comprising a plurality of network nodes, wherein
the distributed network is configured to perform a method for reaching a consensus on a sequence of values by an asynchronous consensus protocol, the method comprising
performing consecutive notarization rounds, the notarization rounds comprising
creating, by one or more network nodes, value proposals to be added to the sequence, the value proposals comprising a link to a parent value proposal of a previous notarization round;
communicating the value proposals to a notarization subset of the plurality of nodes;
performing, by each node of the notarization subset, a validity check of received value proposals, the validity check comprising a check whether the received value proposals comply with a predefined validity rule set;
executing and communicating, by each node of the notarization subset, individual notarization signatures on a subset of the value proposals that are valid according to the validity check, thereby creating individually-notary signed value proposals;
notarizing, by the distributed network, a value proposal once a predefined notary rule set has been fulfilled once a predefined number of individual notarization signatures has been collected, thereby creating a fully notarized value proposal for the respective notarization round;
performing, once a fully notarized value proposal of a current notarization round has been observed, by each of the nodes of the notarization subset, a consistency check of the value proposals of one or more notarization rounds with respect to its own individual notarization signatures executed in the current notarization round, the consistency check comprising a check whether the value proposals of one or more of the consecutive notarization rounds comply with a predefined consistency rule set, wherein a value proposal of a current notarization round is considered to be consistent according to the consistency rule set if a respective node of the notarization subset has not executed in the current notarization round an individual notarization signature on any value proposal different from the value proposal;
executing and communicating, by each of the nodes of the notarization subset, a consistency signature on a subset of the value proposals which are consistent according to the consistency rule set, thereby creating consistency-signed value proposals;
wherein the method further comprises a finality procedure, the finality procedure comprising
finalizing, by the distributed network, a value proposal once a predefined finality rule set has been fulfilled for the value proposal, thereby creating a finalized value, wherein the finality rule set comprises a predefined minimum number of consistency signatures; and
adding the finalized value to the sequence of values.

2. A network according to claim 1, wherein the value proposals comprise the current notarization round number.

3. A distributed network according to claim 1, wherein the validity rule set specifies that a value proposal is only valid if its corresponding parent value proposal has been fully notarized.

4. A distributed network according to claim 1, wherein performing the validity check of a received value proposal comprises a check of one or more features of the received value proposal, wherein the one or more features are selected from the group consisting of:
- the network node that has created the received value proposal;
- the content of the received value proposal; and
- the content of a previous value proposal that is linked by the received value proposal.

5. A distributed network according to claim 1, wherein the finality rule set is configured to be fulfilled for a value proposal once a predefined number of consistency signatures has been observed for the value proposal.

6. A distributed network according to claim 1, wherein the finality rule set is configured to be fulfilled for a value proposal once
- a predefined number of consistency signatures has been observed for the value proposal; and
- the value proposal has been fully notarized.

7. A distributed network according to claim 1, wherein the method further comprises moving to the next notarization round of the method once a fully notarized value proposal of a current notarization round has been observed.

8. A distributed network according to claim 1, wherein the notarization rounds comprise a timeout period at the beginning of each notarization round, wherein the notarization subset of the plurality of nodes is configured to wait with the execution of the individual notarization signatures until the timeout period has expired.

9. A distributed network according to claim 1, wherein the network is configured to
- add a finality signature of the respective last finalized value to the value proposals of the current notarization round.

10. A distributed network according to claim 1, wherein the network is configured to
- regularly change the nodes of the notarization subset.

11. A distributed network according to claim 1, wherein the consistency-signed value proposals comprise
- the notarization round number to be finalized;
- the current notarization round number; and
- the signing node.

12. A distributed network according to claim 1, wherein the values are blocks to be written to a blockchain.

13. A distributed network according to claim 1, wherein the distributed network is configured to assign a rank to a value proposal, wherein performing the validity check comprises
- disregarding invalid value proposals; and
- compiling a list of valid value proposals;
and wherein executing the individual notarization signatures comprises
- executing a single individual notarization signature only on the valid value proposal with the highest rank of the list.

14. A distributed network according to claim 1,
- wherein the step of performing the consistency check is performed for a single notarization round to be finalized.

15. A distributed network according to claim 1,
- wherein the network is configured to perform the consistency check for multiple notarization rounds to be finalized.

16. A distributed network according to claim 1, wherein the network is configured to select a number n of the nodes of the notarization subsets, a predefined number t1 of individual notarization signatures required to notarize a value proposal and to create a fully notarized value proposal and a predefined number t2 of consistency signatures required to fulfill the finality rule set and to finalize a value proposal according to the equation as follows:

$$t1+t2>n+f;$$

wherein the network is configured for the security assumption that in every notarization subset at most f nodes are Byzantine, while the rest is honest.

17. A distributed network according to claim 1, wherein
- the communicating of the value proposals to the notarization subset is performed during a first period of the notarization rounds; and
- the execution of the individual notarization signatures and of the consistency signatures and the communicating comprises a broadcasting of the individual notarization signatures and the consistency signatures performed during a second period of the notarization rounds.

18. A distributed network according to claim 17, wherein the first period of the notarization rounds is at least as long as the second period of the notarization rounds or at least twice as long as the second period.

19. A distributed network according to claim 17, wherein
- the value proposals have a size of at least 1 MByte; and
- the individual notarization signatures and the consistency signatures have a size of less than 200 Byte.

20. A distributed network according to claim 1, wherein the distributed network is configured to use at least 60% of the time for communicating the value proposals.

21. A computer-implemented method for reaching a consensus on a sequence of values by an asynchronous consensus protocol to be performed in a distributed network, the method comprising
- performing consecutive notarization rounds, the notarization rounds comprising
- creating, by one or more network nodes of the distributed network, value proposals to be added to the sequence, the value proposals comprising a link to a parent value proposal of a previous notarization round;
- communicating the value proposals to a notarization subset of the plurality of nodes;
- performing, by each node of the notarization subset, a validity check of received value proposals, the validity check comprising a check whether the received value proposals comply with a predefined validity rule set;
- executing and communicating, by each node of the notarization subset, individual notarization signatures on a subset of the value proposals that are valid according to the validity check, thereby creating individually-notary signed value proposals;
- notarizing, by the distributed network, a value proposal once a predefined notary rule set has been fulfilled once a predefined number of individual notarization signatures has been collected, thereby creating a fully notarized value proposal for the respective notarization round;
- performing, once a fully notarized value proposal of a current notarization round has been observed, by each of the nodes of the notarization subset, a consistency check of the value proposals of one or more notarization rounds with respect to its own individual notarization signatures executed in the current notarization round, the consistency check comprising a check whether the value proposals comply with a predefined consistency rule set;

executing and communicating, by each of the nodes of the notarization subset, a consistency signature on a subset of the value proposals which are consistent according to the consistency rule set, wherein a value proposal of a current notarization round is considered to be consistent according to the consistency rule set if a respective node of the notarization subset has not executed in the current notarization round an individual notarization signature on any value proposal different from the value proposal;

performing a finality procedure comprising
finalizing, by the distributed network, a value proposal once a predefined finality rule set has been fulfilled for the value proposal, thereby creating a finalized value, wherein the finality rule set comprises a predefined minimum number of consistency signatures; and
adding the finalized value to the sequence of values.

22. A network node for a distributed network, wherein the network node is configured to perform one or more steps of the method according to claim 21.

23. A computer program product for operating a node of a distributed network, the computer program product comprising a computer readable storage medium having program instructions embodied therewith, the program instructions executable by the node to cause the node to perform one or more of the steps of the computer-implemented method according to claim 21.

* * * * *